United States Patent
Nagata et al.

(10) Patent No.: US 10,776,484 B2
(45) Date of Patent: Sep. 15, 2020

(54) ON-CHIP MONITOR CIRCUIT AND SEMICONDUCTOR CHIP

(71) Applicants: NATIONAL UNIVERSITY CORPORATION KOBE UNIVERSITY, Kobe-shi, Hyogo (JP); TELECOM PARISTECH, Paris (FR)

(72) Inventors: Makoto Nagata, Kobe (JP); Jean-Luc Danger, Paris (FR); Daisuke Fujimoto, Kobe (JP); Shivam Bhasin, Paris (FR)

(73) Assignees: NATIONAL UNIVERSITY CORPORATION KOBE UNIVERSITY, Kobe-Shi, Hyogo (JP); TELECOM PARISTECH, Paris (FR)

( * ) Notice: Subject to any disclaimer, the term of this patent is extended or adjusted under 35 U.S.C. 154(b) by 0 days.

(21) Appl. No.: 15/543,501

(22) PCT Filed: Jan. 12, 2016

(86) PCT No.: PCT/JP2016/050725
§ 371 (c)(1),
(2) Date: Jul. 13, 2017

(87) PCT Pub. No.: WO2016/114267
PCT Pub. Date: Jul. 21, 2016

(65) Prior Publication Data
US 2018/0004944 A1  Jan. 4, 2018

(30) Foreign Application Priority Data
Jan. 13, 2015 (JP) .................. 2015-004346

(51) Int. Cl.
*G06F 21/00* (2013.01)
*G06F 21/55* (2013.01)
(Continued)

(52) U.S. Cl.
CPC ....... *G06F 21/556* (2013.01); *G01R 31/2884* (2013.01); *G06F 11/22* (2013.01);
(Continued)

(58) Field of Classification Search
CPC ... G06F 21/556; G06F 11/22; G01R 31/2884; G01R 31/31719; H01L 21/822; H01L 27/04; H04L 9/10
See application file for complete search history.

(56) References Cited

U.S. PATENT DOCUMENTS 6,298,458 B1 * 10/2001 Cranford, Jr. ........... H04L 43/50
370/245
7,525,331 B1 * 4/2009 Jairam ............. G01R 31/31851
324/750.3
(Continued)

FOREIGN PATENT DOCUMENTS

JP  H05-251523 A  9/1993
JP  2009-089045 A  4/2009
(Continued)

OTHER PUBLICATIONS

Eric Brier et al., "Correlation Power Analysis with a Leakage Model," CHES 2004, vol. 3156 of LNCS, pp. 16-29, Aug. 2004.
(Continued)

*Primary Examiner* — Ghodrat Jamshidi
(74) *Attorney, Agent, or Firm* — Baker & Hostetler LLP

(57) ABSTRACT

Provided is an on-chip monitor circuit mounted on a semiconductor chip that is equipped with a security function module for performing a security function process on an input signal and outputting a security function signal, the on-chip monitor circuit comprising a monitor circuit for monitoring signal waveforms of the semiconductor chip, wherein the circuit is provided with a first storage means for storing data that designates a window period in which to
(Continued)

perform a test of the semiconductor chip, and a control means for performing control to operate the circuit during the window period, when a prescribed test signal is inputted to the security function module. By using the on-chip monitor circuit in a semiconductor chip of which security is required, security attacks, e.g., a Trojan horse or the like, intended to embed a malicious circuit in the production stage of security function module-equipped semiconductors chips, can be prevented.

15 Claims, 21 Drawing Sheets

(51) Int. Cl.
G06F 11/22 (2006.01)
H01L 21/822 (2006.01)
H04L 9/10 (2006.01)
H01L 27/04 (2006.01)
G01R 31/28 (2006.01)
G01R 31/317 (2006.01)

(52) U.S. Cl.
CPC ............ *H01L 21/822* (2013.01); *H01L 27/04* (2013.01); *H04L 9/10* (2013.01); *G01R 31/31719* (2013.01)

(56) References Cited

U.S. PATENT DOCUMENTS

| | | | | |
|---|---|---|---|---|
| 2002/0130807 | A1* | 9/2002 | Hall | G01S 7/282 342/28 |
| 2004/0093535 | A1* | 5/2004 | Eleyan | G01R 31/31725 714/30 |
| 2005/0066189 | A1 | 3/2005 | Moss et al. | |
| 2006/0050929 | A1* | 3/2006 | Rast | F41G 3/147 382/103 |
| 2007/0011508 | A1* | 1/2007 | Rong | G11C 29/02 714/718 |
| 2007/0011542 | A1* | 1/2007 | Mukherjee | G01R 31/318541 714/738 |
| 2008/0276111 | A1 | 11/2008 | Jacoby et al. | |
| 2009/0095955 | A1 | 4/2009 | Kim et al. | |
| 2009/0295402 | A1* | 12/2009 | Balch | G01R 31/2884 324/537 |
| 2010/0001776 | A1* | 1/2010 | Nakamura | G01R 31/31917 327/252 |
| 2010/0145672 | A1* | 6/2010 | Yen | G06F 1/28 703/28 |
| 2010/0246808 | A1 | 9/2010 | Hisakado et al. | |
| 2011/0045323 | A1* | 2/2011 | Ooi | H01M 2/1066 429/50 |
| 2011/0261953 | A1 | 10/2011 | Guilley et al. | |
| 2012/0200159 | A1* | 8/2012 | Katagiri | H03K 19/00361 307/43 |
| 2013/0070651 | A1* | 3/2013 | Nishizaka | H04B 3/542 370/276 |
| 2013/0127441 | A1* | 5/2013 | Tseng | G01R 19/16552 324/76.11 |
| 2015/0323590 | A1* | 11/2015 | Xu | G01R 31/2886 324/762.02 |
| 2016/0139199 | A1* | 5/2016 | Petrie | G01R 31/2884 324/750.3 |
| 2016/0274178 | A1* | 9/2016 | Goel | G01R 31/318307 |

FOREIGN PATENT DOCUMENTS

KR 10-2004-0049117 A 6/2004
WO 2014/144857 A2 9/2014

OTHER PUBLICATIONS

Suresh Chari et al., "Template Attacks," CHES 2002, vol. 2523 of LNCS, pp. 13-28, Aug. 2002.
Suvadeep Hajra et al., "SNR to success rate: Reaching the limit of non-profiling DPA," Cryptology ePrint Archive, Report 2013/865, 2013.
Michael Muehlberghuber et al., "Red Team vs. Blue Team Hardware Trojan Analysis, Detection of a Hardware Trojan on an Actual ASIC," Proceedings of the 2nd International Workshop on Hardware and Architectural Support for Security and Privacy (HASP 2013), Article No. 1, 2013.
Daisuke Fujimoto et al., "Side-Channel Leakage on Silicon Substrate of CMOS Cryptographic Chip," 2014 IEEE International Symposium on Hardware-Oriented Security and Trust (HOST), pp. 32-37.
Paul C. Kocher et al., "Differential Power Analysis," Proceedings of CRYPTO'99, LNCS, vol. 1666, 1999, pp. 388-397.
Laurent Sauvage et al., "Electro-Magnetic Attacks Case Studies on Non-Protected and Protected Cryptographic Hardware Accelerators," IEEE EMC, Special session #4 on Modeling/Simulation Validation and use of FSV, Jul. 25-30, 2010.
U.S. Department Of Defense, "Defense Science Board Task Force on High Performance Microchip Supply," Feb. 2005, retrieved Dec. 10, 2014 <http://www.acq.osd.mil/dsb/reports/2005-02-HPMS_Report_Final.pdf>.

* cited by examiner

[FIG. 1A]
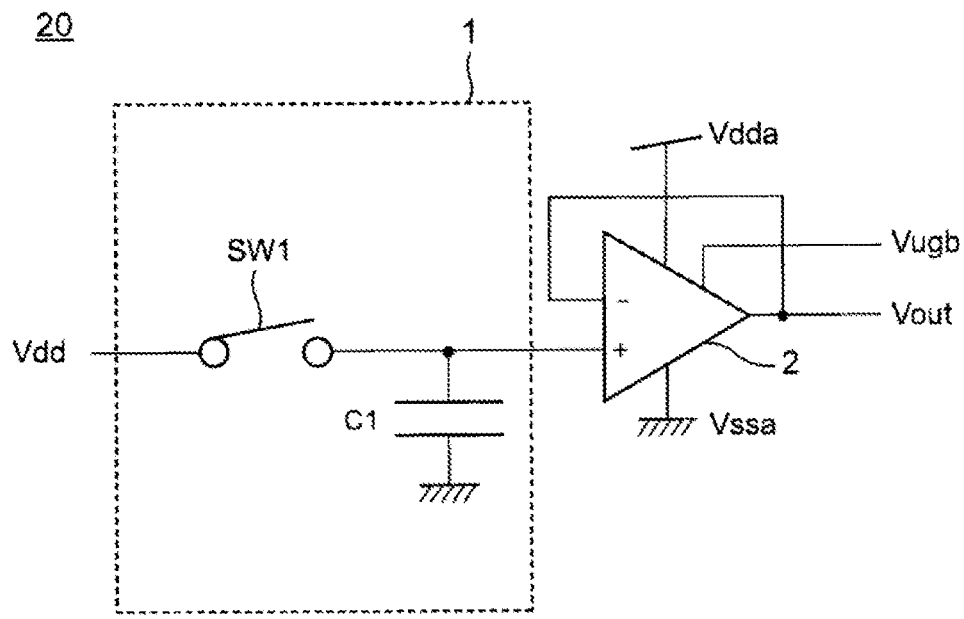
[FIG. 1B]
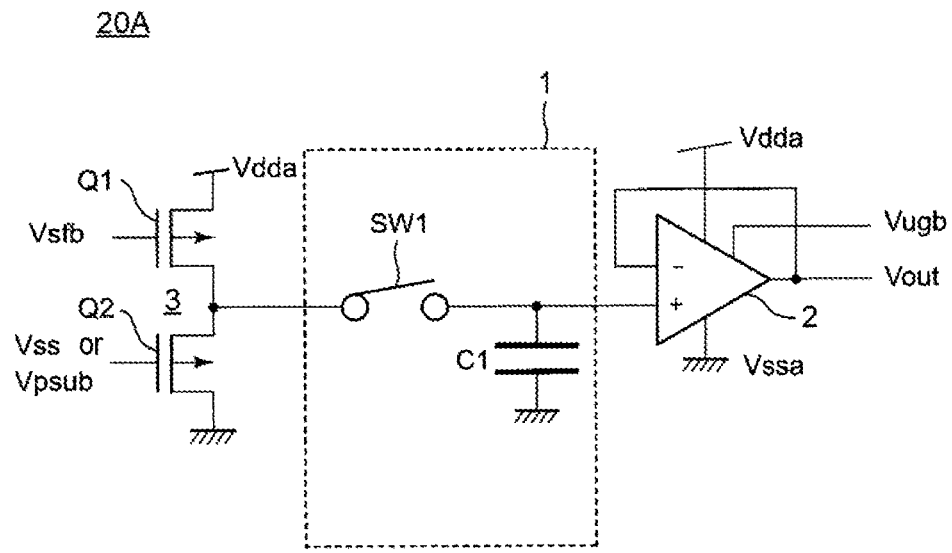

[FIG. 2]
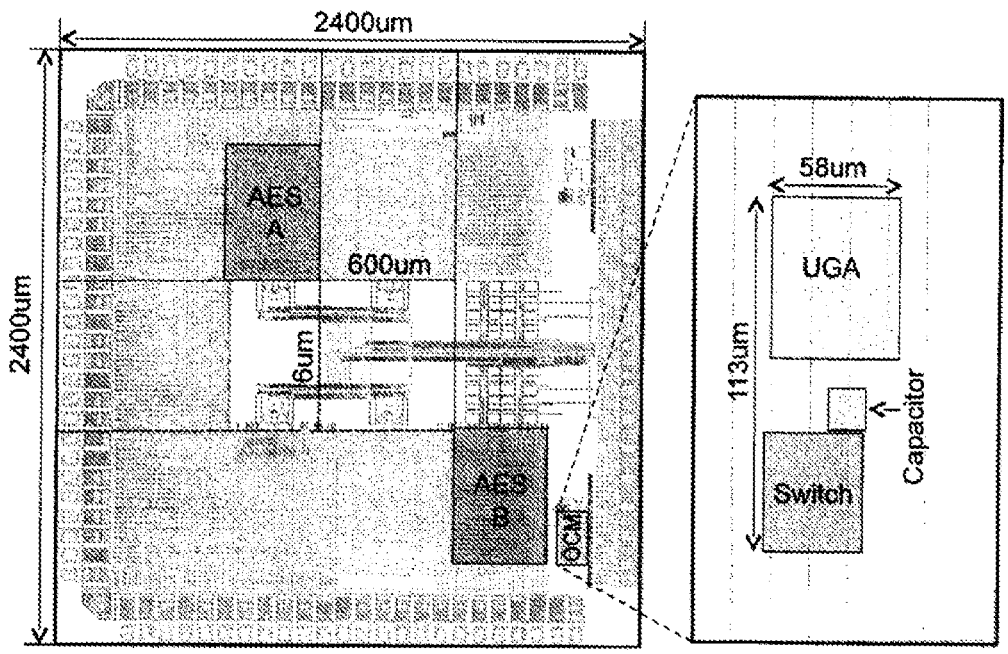
[FIG. 3A]
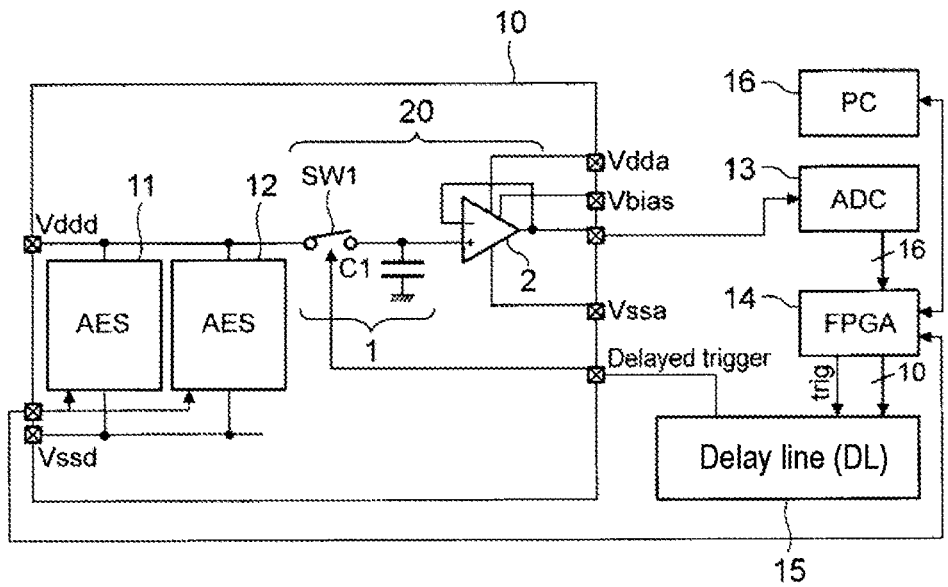

[FIG. 4A]
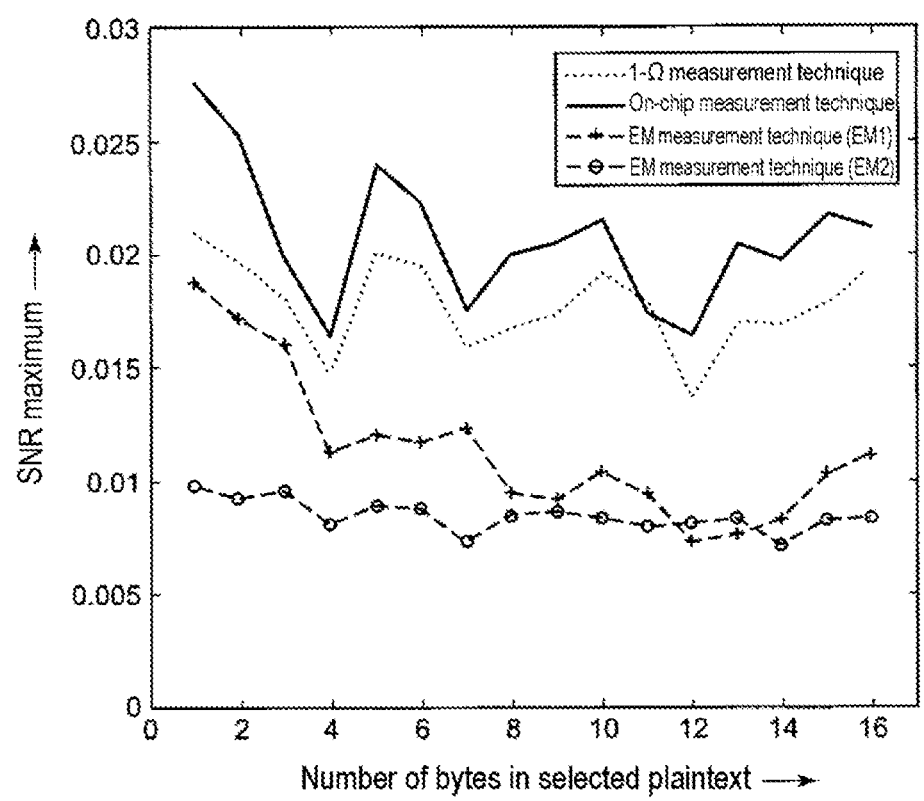

[FIG. 4B]
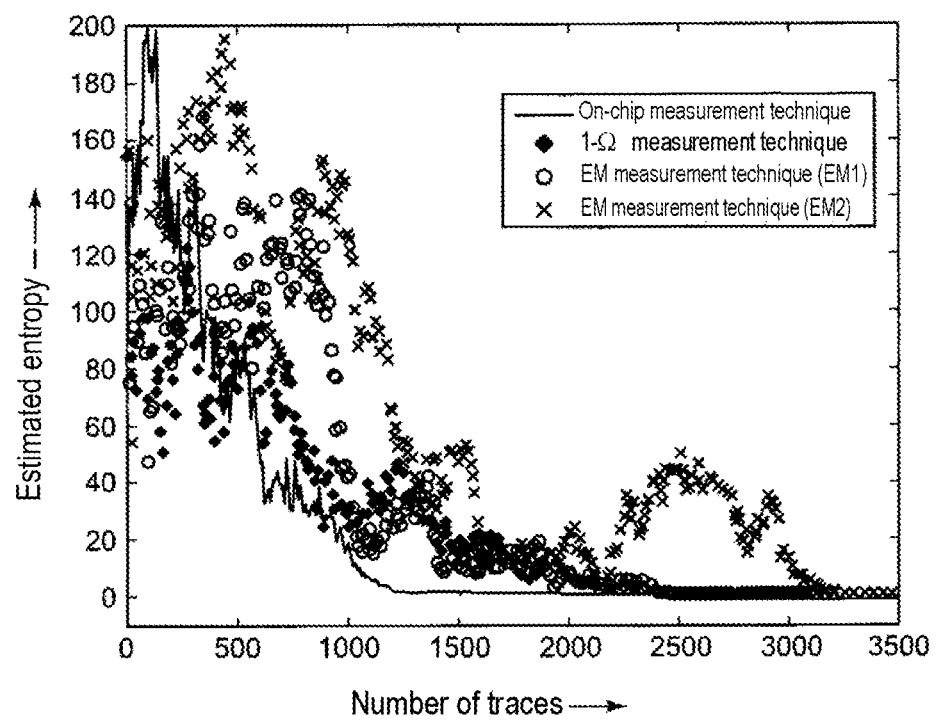

[FIG. 5A]
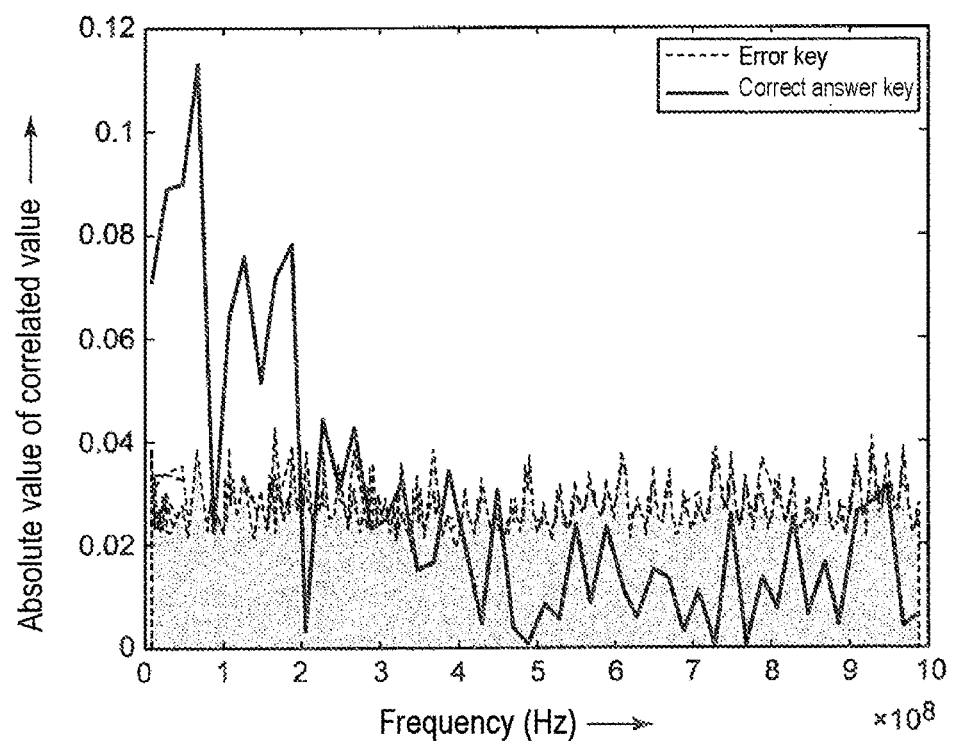

[FIG. 5B]
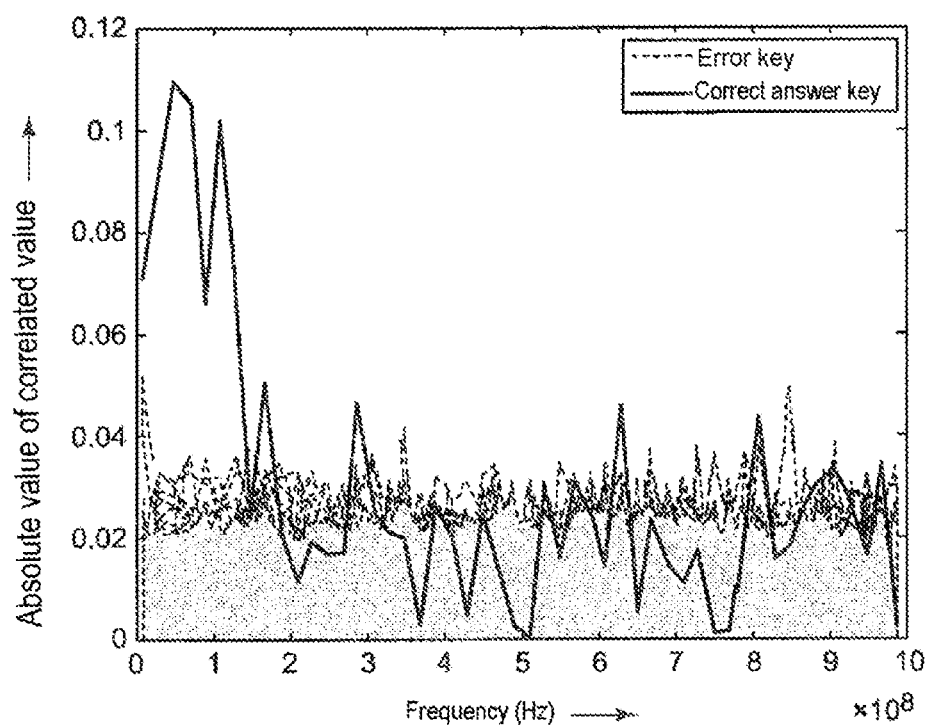

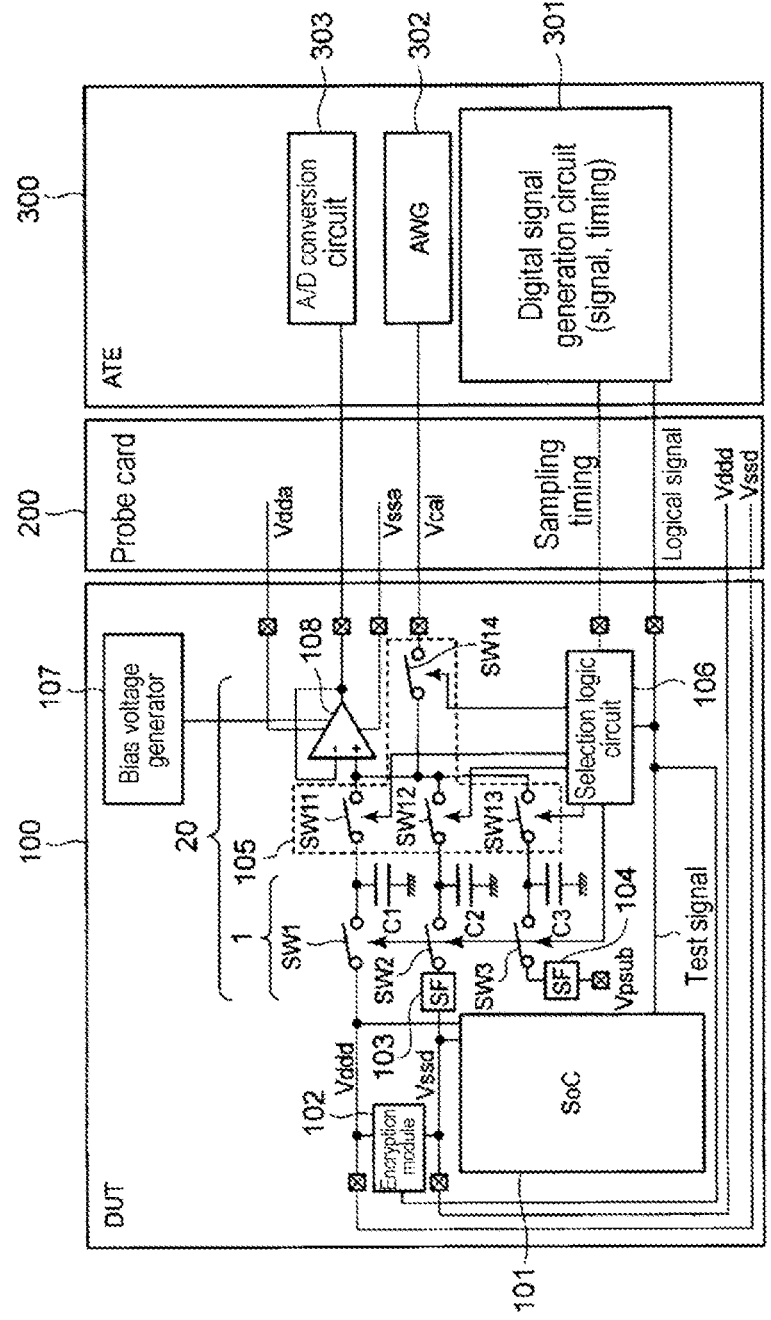
[FIG. 6A]

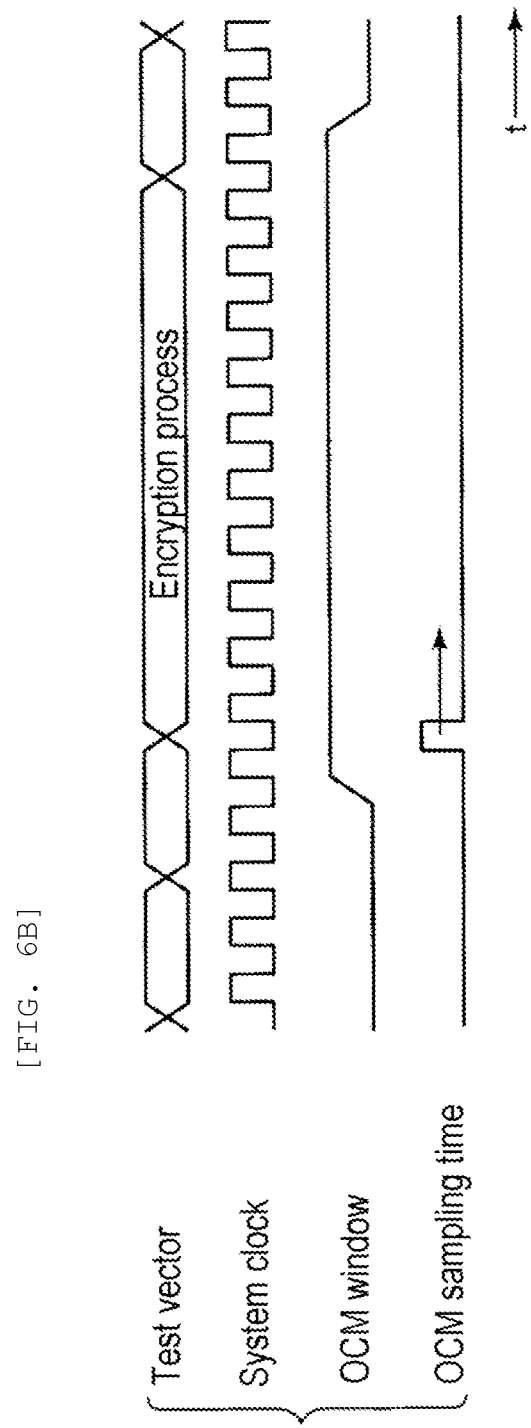

[FIG. 7]
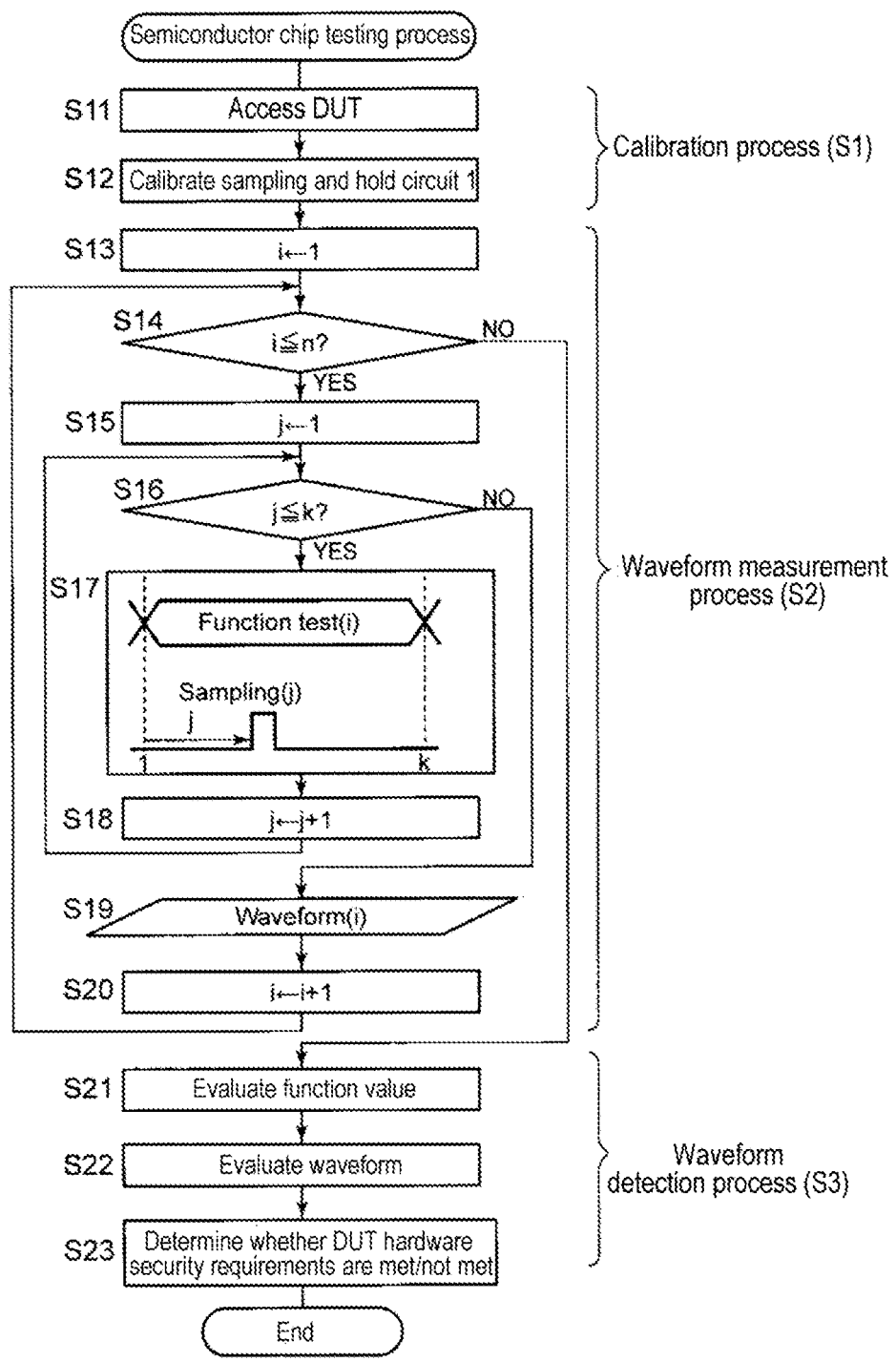

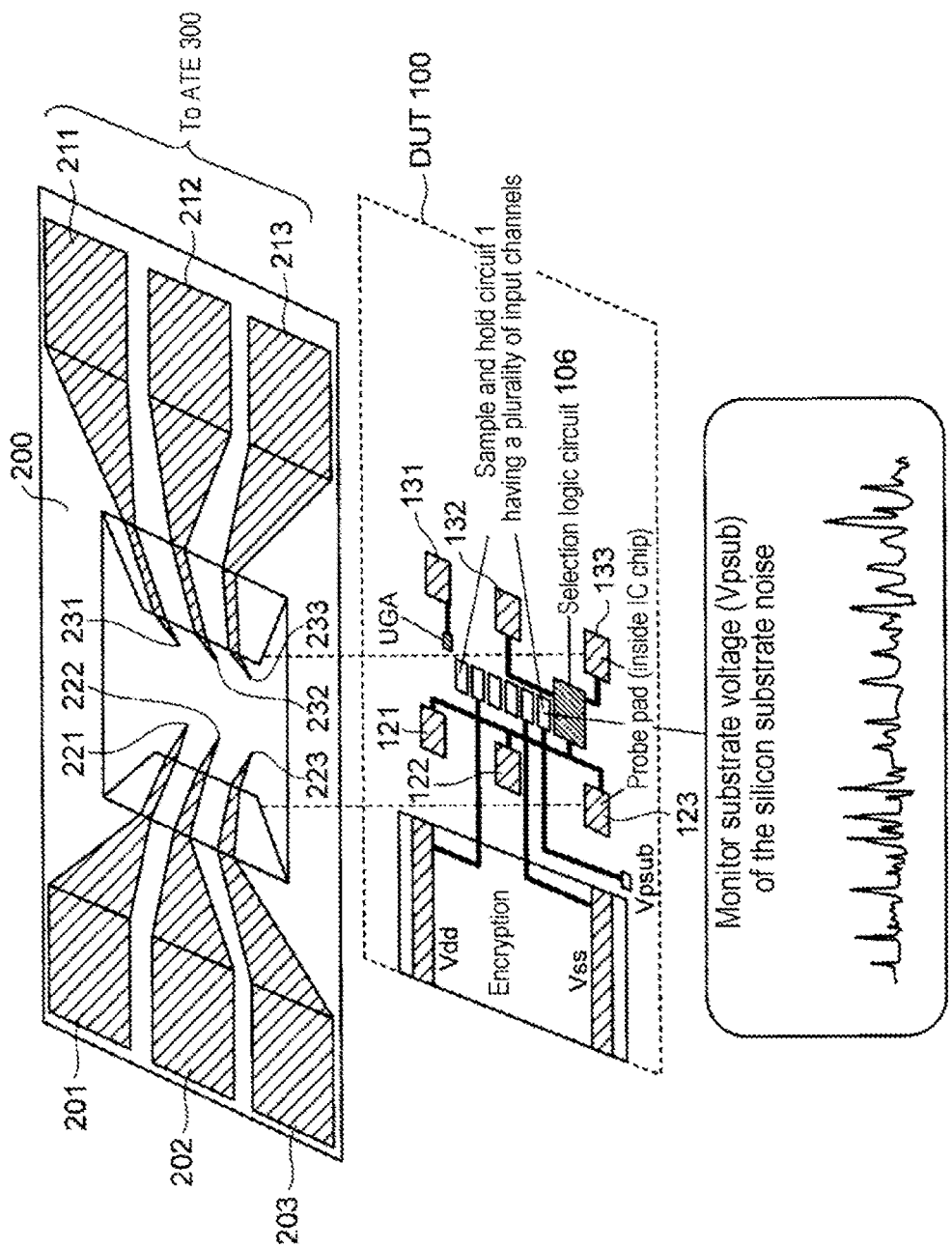

[FIG. 9]
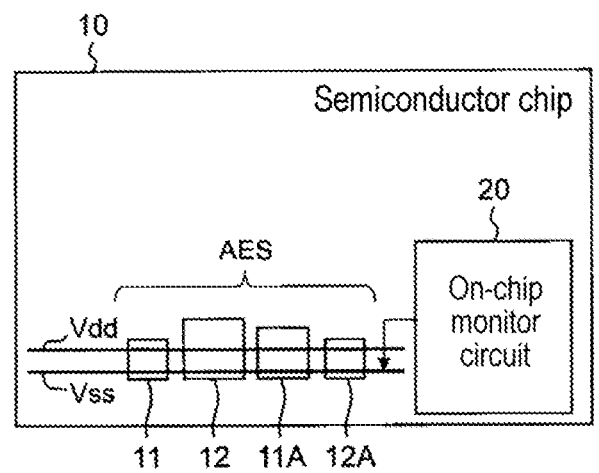
[FIG. 10]
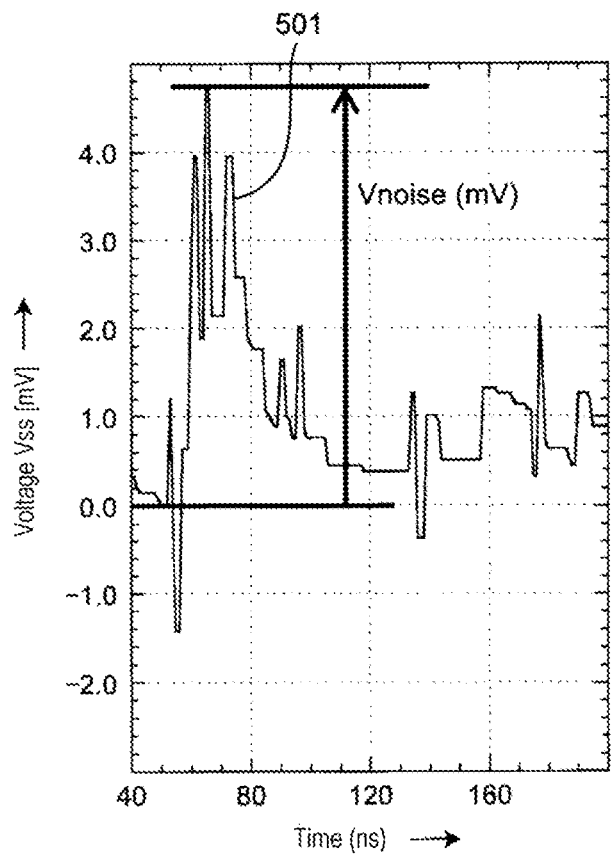

[FIG. 11]
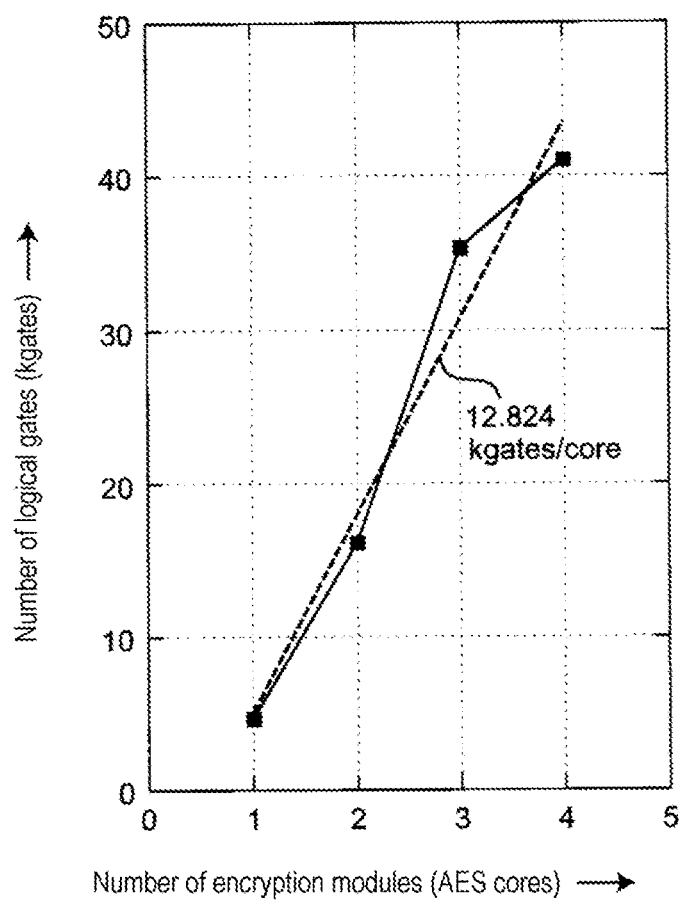

[FIG. 12]
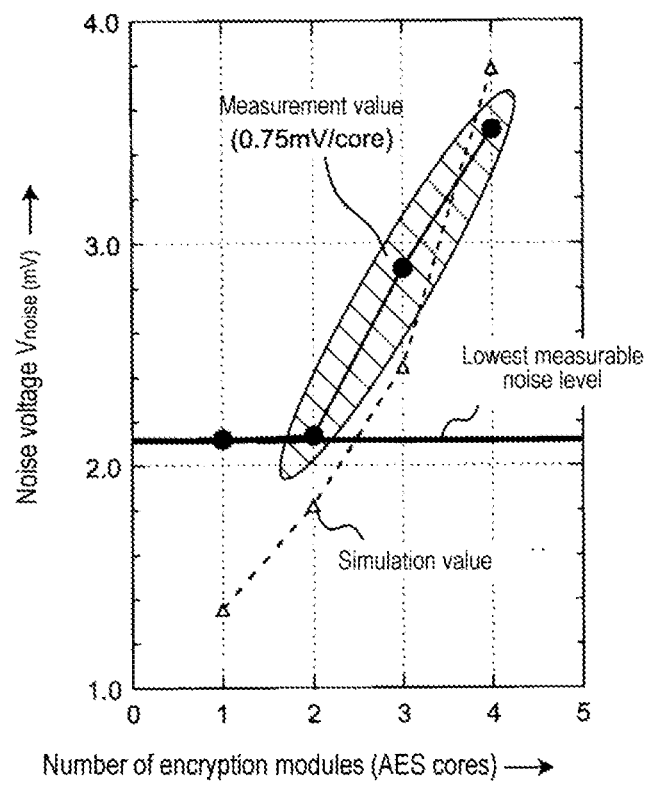
[Fig. 13]
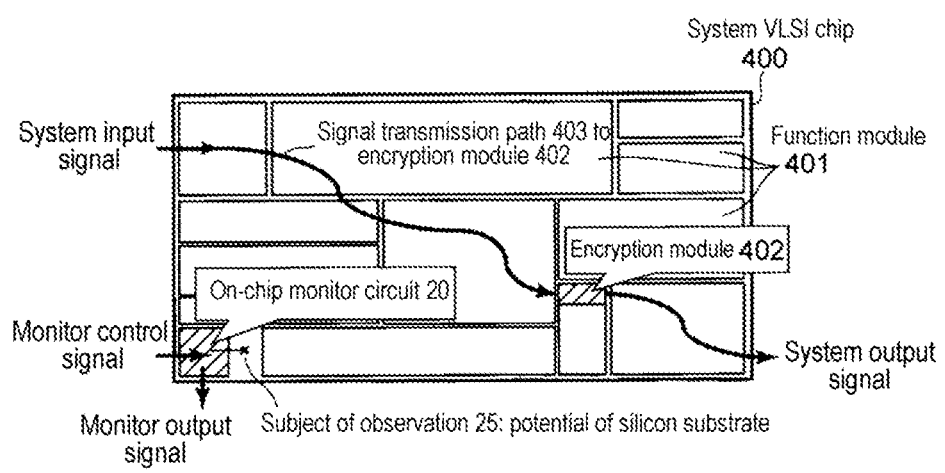

[FIG. 14]
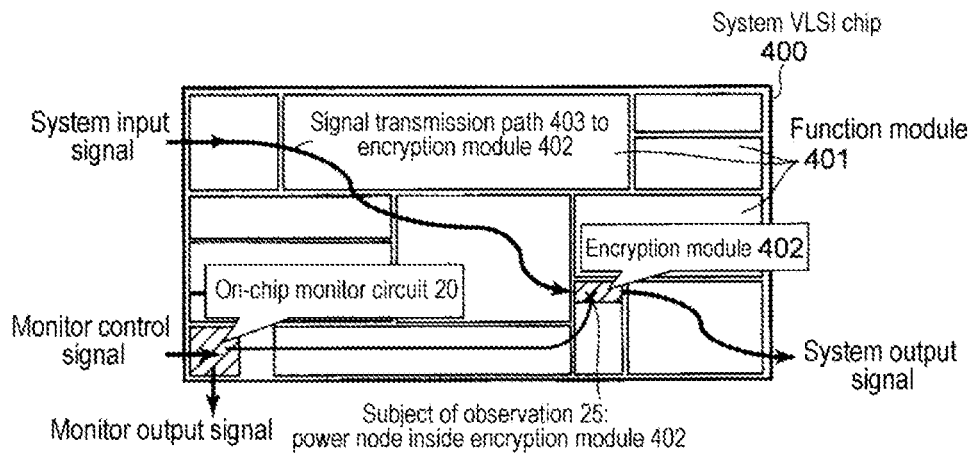
[FIG. 15A]
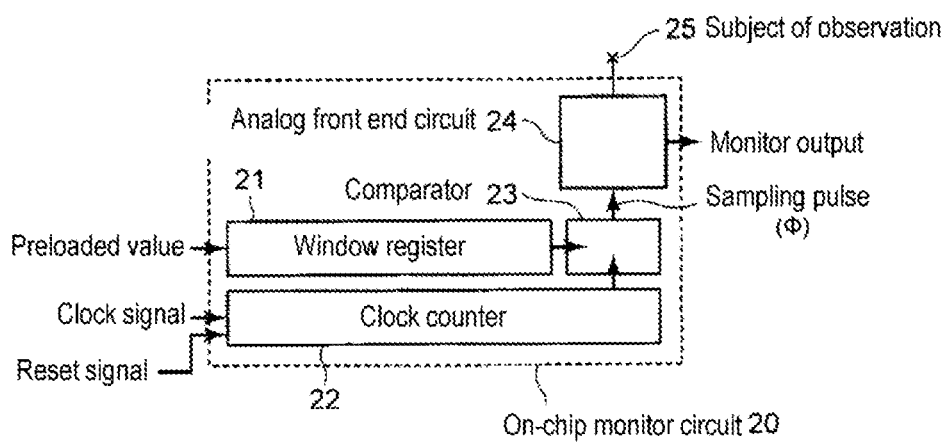
[FIG. 15B]
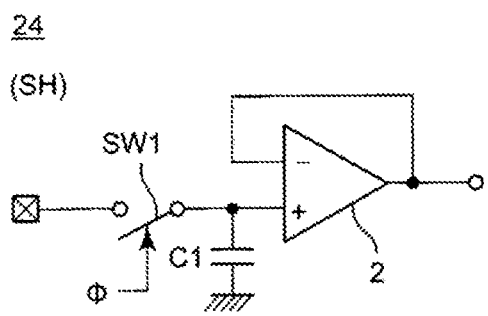

[FIG. 15C]
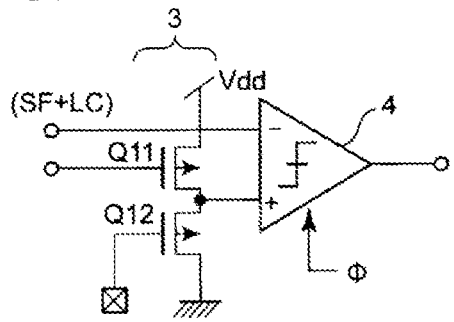
[FIG. 16]
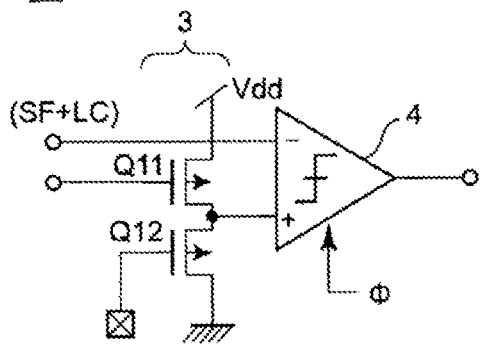
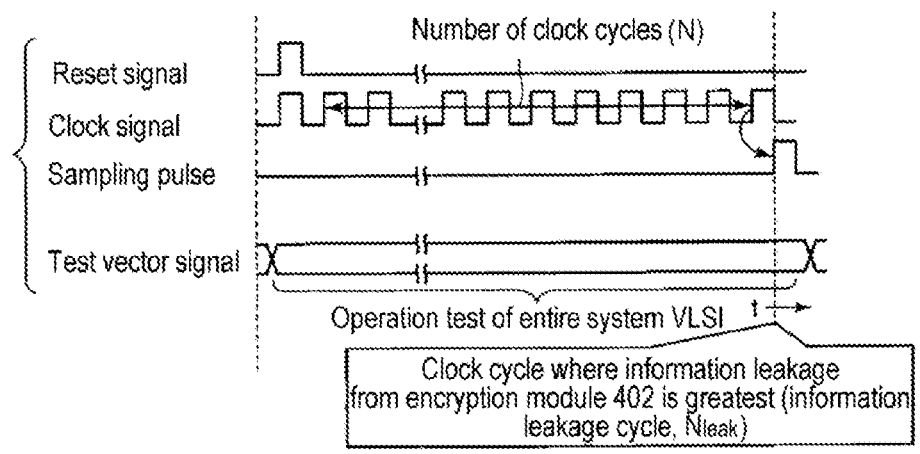

[FIG. 17]
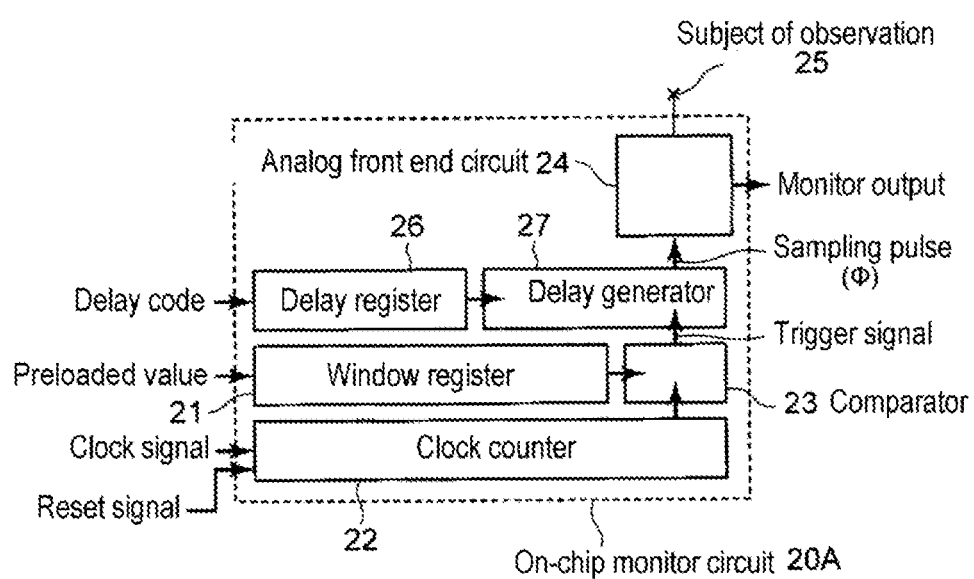

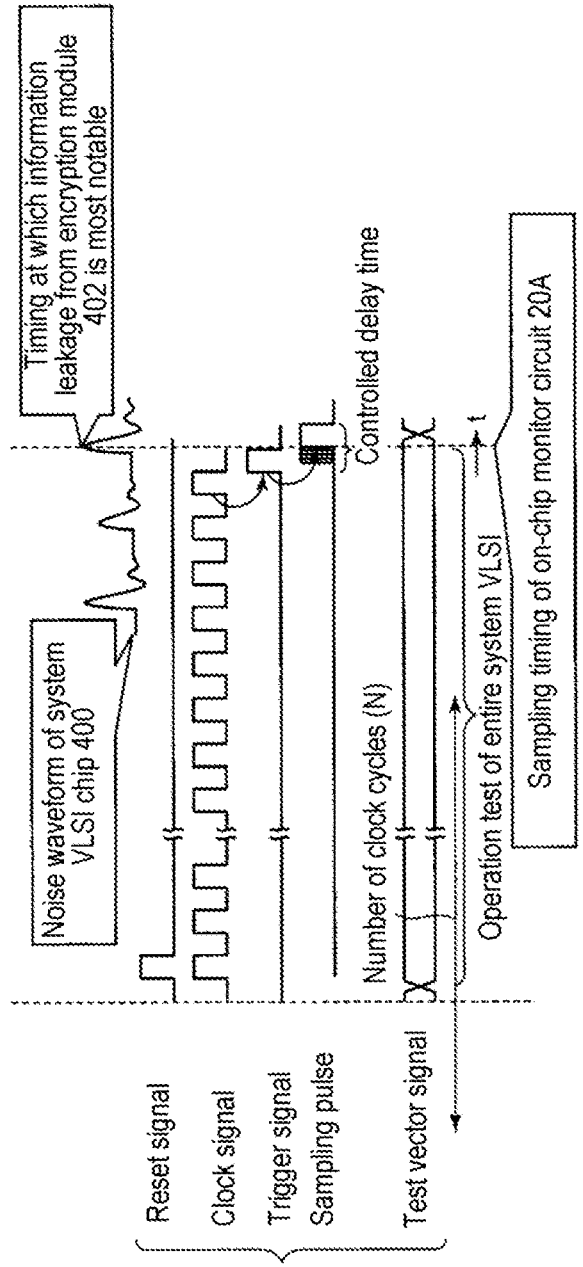
[FIG. 18]

[FIG. 19]
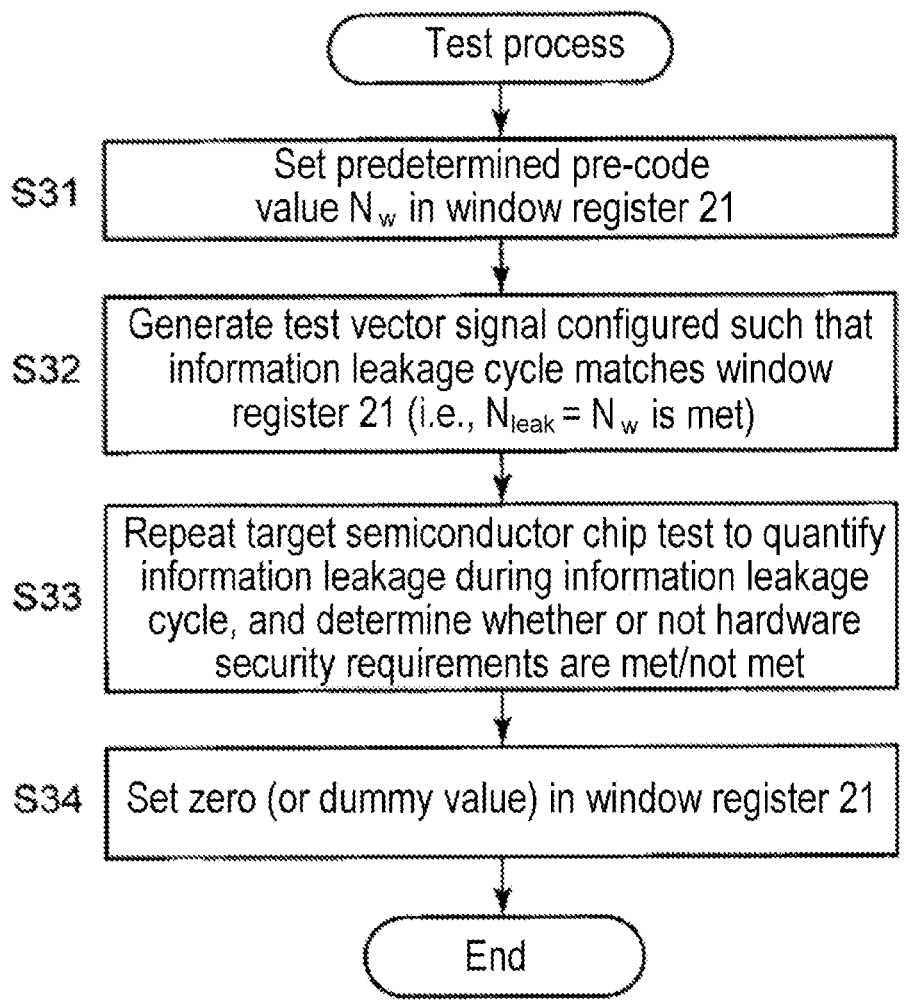

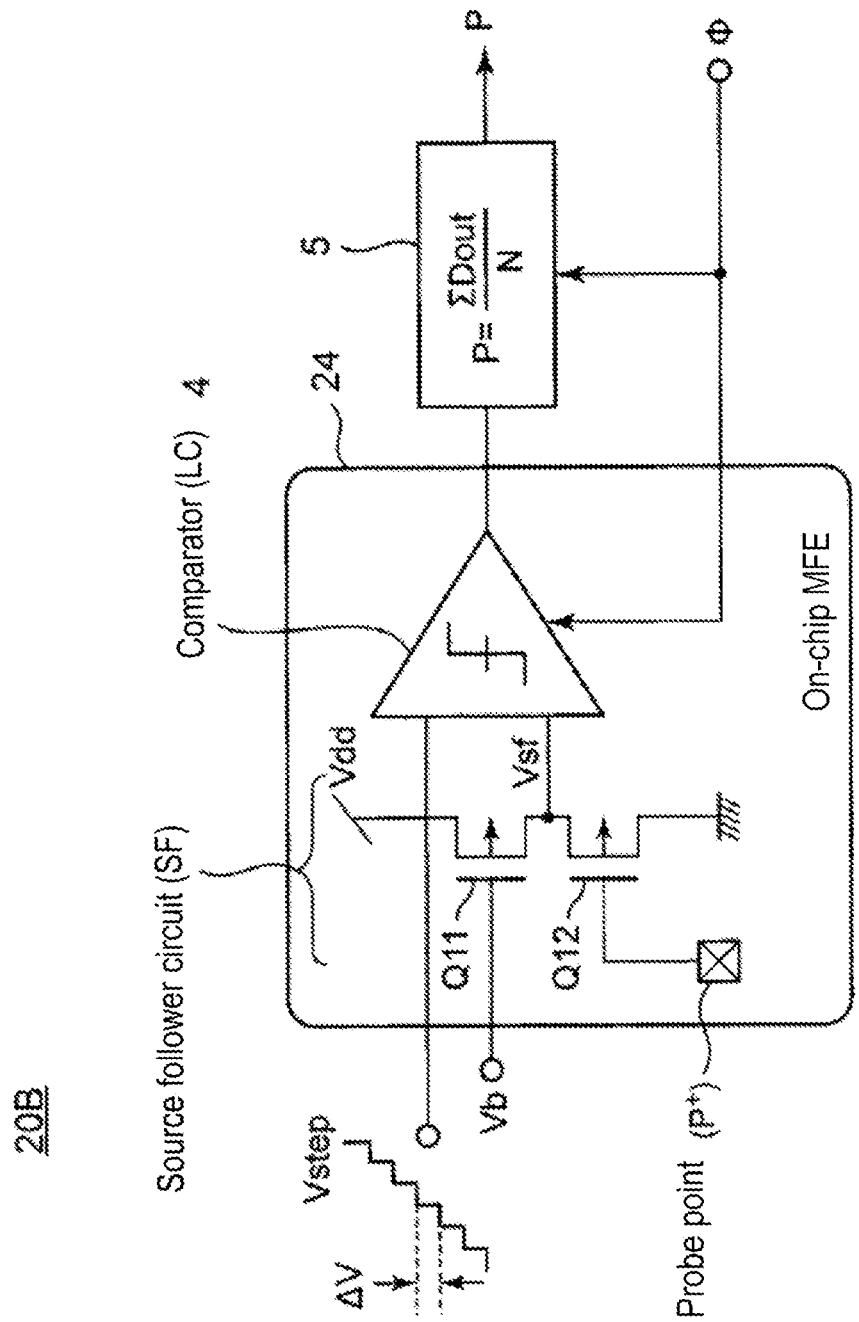
[FIG. 20]

ON-CHIP MONITOR CIRCUIT AND SEMICONDUCTOR CHIP

CROSS-REFERENCE TO RELATED APPLICATIONS

This application is a National Stage of International patent application PCT/JP2016/050725, filed on Jan. 12, 2016, which claims priority to foreign Japanese patent application No. JP 2015-004346, filed on Jan. 13, 2015, the disclosures of which are incorporated by reference in their entirety.

TECHNICAL FIELD

The present invention relates to an on-chip monitor circuit provided with a monitor circuit such as an analog front-end circuit, for example, mounted on a semiconductor chip that is a large-scale integrated (LSI) chip and is provided with an encryption module that encrypts an input signal and outputs an encrypted signal and monitoring the signal waveform of the semiconductor chip; a semiconductor chip provided with said on-chip monitor circuit; a semiconductor chip test system that tests said semiconductor chip; and a method for testing semiconductor chips in which said semiconductor chip is tested.

BACKGROUND ART

As integrated circuits have become smaller and smaller in recent years, down to the sub-micron level, there has been a growth in the number of fabrication defects. Such defects arise because of variations in masks and materials during the fabrication stage. This has created the need for reliable testing and diagnosis of complex integrated circuits.

Security and reliability of integrated circuits is a field of research which has garnered attention over the past ten years. To maintain safety using security, an encrypted core is needed that is capable of withstanding physical and side-channel attacks that take advantage of physical mounting. At the same time, Trojan horses, which embed malicious circuits during the fabrication stage, have also received attention. Security and reliability can become performance indicators to be inspected pre-shipment in products where security is key.

In the technical field of hardware security, processing is left to an embedded encrypted core in applications where security is vital in complex system-on-chip (SoC) configurations. However, security cannot be guaranteed simply by embedding an encrypted core. In order to declare a device secure, it has to be tested against various threats and policies. One example of a threat is a side-channel attack (SCA) (see for example Non-Patent Literature 1, 2, and 5). Side-channel attacks are carried out by abusing information unintentionally radiated from a physical device, such as power consumption, electromagnetic wave radiation, processing time, and so on.

The theory and implementation of side-channel attacks have been widely discussed at academic conferences, but no standard measurement environment has been described for analyzing such attacks. The most common method for measuring power consumption is the low-resistance method, whereby a resistor of around 1 Ω is inserted between the ground (GND) pin and the ground (GND) of the semiconductor chip. This technique is also called a low-side technique (see, for example, Non-Patent Literature 5). A high-side technique has also been proposed for the power, in which a weak resistor is placed between the power voltage (Vcc) pin and the power voltage (Vcc) of the semiconductor chip. Both measurement methods have low implementation costs but also disadvantages. The low signal level is a problem in low-side techniques, while the exposure to significant power source noise from the power supply is a problem for high-side techniques. This means a low SNR (signal-to-noise ratio) in both cases. The resistors that are inserted act like low-pass filters, suppressing high-frequency components in the signal.

Electromagnetic (EM) probes are also used as a way to carry out high-precision side-channel attacks (see, for example, Non-Patent Literature 6). Measurement using electromagnetic probes can be done with little noise, but this depends on the measurement location. The measurement band of electromagnetic probes is several GHz, which is broader than low-resistance techniques.

PRIOR ART LITERATURE

Patent Literature
Patent Literature 1: JP 2011-514046 A (Japanese translation of a WIPO application)
Non-Patent Literature
Non-Patent Literature 1: Eric Brier et al., "Correlation Power Analysis with a Leakage Model", CHES 2004, Vol. 3156 of LNCS, pp. 16-29, Springer, August, 2004 Cambridge, Mass., U.S.A.
Non-Patent Literature 2: Suresh Chari et al., "Template Attacks", CHES 2002, Vol. 2523 of LNCS, pp. 13-28, Springer, August 2002, San Francisco Bay, Redwood City, Calif., U.S.A.
Non-Patent Literature 3: Daisuke Fujimoto et al., "Side-Channel Leakage on Silicon Substrate of CMOS Cryptographic Chip", HOST 2014, IEEE Computer Society, May 2014, Arlington, Va., U.S.A.
Non-Patent Literature 4: Suvadeep Hajra et al., "Snr to success rate: Reaching the limit of non-profiling dpa", Cryptology ePrint Archive, Report 2013/865, 2013, [retrieved 10 Dec. 2014], Internet <URL: http://eprint.iacr.org/>
Non-Patent Literature 5: Paul C. Kocher et al., "Differential Power Analysis", Proceedings of CRYPTO '99, Vol. 1666 of LNCS, pp. 388-397, Springer-Verlag, 1999
Non-Patent Literature 6: Laurent Sauvage et al., "Electro-Magnetic Attacks Case Studies on Non-Protected and Protected Cryptographic Hardware Accelerators", IEEE EMC, Special session #4 on Modeling/Simulation Validation and use of FSV, Jul. 25-30, 2010, Fort Lauderdale, Fla., Calif., U.S.A., [retrieved 10 Dec. 2014], Internet <URL: http://emc2010.org/>
Non-Patent Literature 7: U.S. Department Of Defense, Defense science board task force on high performance microchip supply, retrieved 10 Dec. 2014, Internet <URL: http://www.acq.osd.mil/dsb/reports/2005-02-HPMS_Report_Final.pdf>
Non-Patent Literature 8: Michael Muehlberghuber et al., "Red Team vs. Blue Team Hardware Trojan Analysis, Detection of a Hardware Trojan on an Actual ASIC", Proceedings of the 2nd International Workshop on Hardware and Architectural Support for Security and Privacy (HASP 2013), Article No. 1, 2013

SUMMARY OF THE INVENTION

Problems to be Solved by the Invention

The biggest problems with the aforementioned electromagnetic probes are (1) three-dimensional control of probe position relative to the semiconductor chip and the evaluation board, and (2) stabilization of the surrounding environment, such as ambient electromagnetic waves and physical vibration. The information leakage score value varies depending on the probe position and fluctuations in the electromagnetic field. It is also impossible to ignore the fact that it is affected by the circuit design and physical layout design of the evaluation board. Selection of suitable measurement methods and control of the measurement environment are thus critical problems when testing side-channel leakage amounts as a test item connected to semiconductor chip hardware security.

In the aforementioned standard test flow one problem has been that no security evaluation method has been proposed. There is a particular desire for prevention, for example, of Trojan horse and other security attacks, which embed malicious circuits during the fabrication stage of semiconductor chips provided with encryption modules.

The object of the present invention is to provide an on-chip monitor circuit for testing semiconductor chips so as to prevent, for example, Trojan horse and other security attacks, which embed malicious circuits during the fabrication stage of semiconductor chips provided with encryption modules, by using the on-chip monitor circuit in semiconductor chips which require security.

Another object of the present invention is to provide a semiconductor chip provided with this on-chip monitor circuit, a semiconductor chip testing system that is provided with the semiconductor chip and a testing device, and a method for testing a semiconductor chip.

Means for Solving the Problem

An on-chip monitor circuit according to the first invention is mounted on a semiconductor chip that is provided with a security function module that performs a security function process on an input signal and outputs a security function signal, the on-chip monitor circuit being provided with a monitor circuit that monitors a signal waveform of the semiconductor chip, and comprises
a first storage means for storing data that designates a time window during which the semiconductor chip is tested, and
a control means for performing control such that when a predetermined test signal is input by the security function module the monitor circuit operates during the time window.

In the aforementioned on-chip monitor circuit, the control means comprises
a counting means for counting clock signals and outputting count value data after receiving a reset signal, and
a comparing means for comparing the count value data and data designating the time window, and causing the monitor circuit to operate when the data match.

The on-chip monitor circuit is characterized in that the time window is the period of time during which there is the most information leakage in the security function module.

The aforementioned on-chip monitor circuit further comprises
a second storage means for storing a delay code that has been input, and is characterized in that
the control means delays the timing of the time window by a delay time corresponding to the delay code.

The aforementioned on-chip monitor circuit is characterized in that the delay code indicates a delay amount that designates a timing during which there is the most information leakage from the security function module.

The on-chip monitor circuit is characterized in that the monitor circuit monitors the signal waveform of the substrate potential of the semiconductor chip or the power potential of the security function module.

The on-chip monitor circuit is characterized in that the control means stops operation of the monitor circuit after testing of the semiconductor chip is finished.

The aforementioned on-chip monitor circuit is characterized in that the control means is rendered logically unrewritable by storing at least one predetermined value from the first storage means or the second storage means after testing of the semiconductor chip is finished.

The on-chip monitor circuit is characterized in that the security function module is an encryption module.

A semiconductor chip according to the second invention is provided with a security module that performs a security function process on an input signal and outputs a security function signal, and comprises
the aforementioned on-chip monitor circuit.

A semiconductor chip testing system according to the third invention is provided with
the aforementioned semiconductor chip, and
a testing device that tests the semiconductor chip,
and is characterized in that
the testing device is provided with a test signal generation means for generating a test signal and outputting this to the semiconductor chip such that a time period of information leakage from the security function module falls within the time window, and
a judgment means for judging a security score by quantifying information leakage from the security function module on the basis of the signal waveform from the monitor circuit.

A method for testing a semiconductor chip according to the fourth invention is a method for testing a semiconductor chip using an on-chip monitor circuit that is mounted on the semiconductor chip that is provided with a security function module that performs a security function process on an input signal and outputs a security function signal, the on-chip monitor circuit being provided with a monitor circuit that monitors a signal waveform of the semiconductor chip, comprising
a step of storing to a first storage means data that designates a time window during which the semiconductor chip is tested, and
a step of performing control such that when a predetermined test signal is input by the security function module the monitor circuit operates during the time window.

The method for testing a semiconductor chip further comprises
a step of storing a delay code that has been input into a second storage means, and
a step of delaying the timing of the time window by a delay time corresponding to the delay code.

The method for testing a semiconductor chip further comprises
a step of generating a test signal and outputting this to the semiconductor chip such that a time period of information leakage from the security function module falls within the time window, and
a step of judging a security score by quantifying information leakage from the security function module on the basis of the signal waveform from the monitor circuit.

The method for testing a semiconductor chip further comprises a step of stopping operation of the monitor circuit after testing of the semiconductor chip is finished.

The method for testing a semiconductor chip further comprises a step of producing a logically unrewritable state by storing at least one predetermined value from the first storage means or the second storage means after testing of the semiconductor chip is finished.

The method for testing a semiconductor chip is characterized in that the security function module is an encryption module.

Effects of the Invention

With the on-chip monitor circuit according to the present invention, an on-chip monitor circuit, etc., can be provided for testing a semiconductor chip so as to be able to prevent, for example, Trojan horse and other security attacks, which embed malicious circuits during the fabrication stage of semiconductor chips provided with security function modules, using the on-chip monitor circuit in semiconductor chips which require security.

BRIEF DESCRIPTION OF THE DRAWINGS

FIG. 1A is a circuit diagram showing a basic configuration of an on-chip monitor circuit according to embodiment 1.

FIG. 1B is a circuit diagram showing a basic configuration of an on-chip monitor circuit according to embodiment 1.

FIG. 2 is a plan view showing a layout of a semiconductor chip that is to be measured.

FIG. 3A is a block diagram showing a configuration of a prototype semiconductor chip testing system according to embodiment 1.

FIG. 4A is a graph showing SNR relative to selected plaintext, being the result of leakage analysis using the semiconductor chip testing system in FIG. 3.

FIG. 4B is a graph showing the estimated entropy of various measurements, being the result of leakage analysis using the semiconductor chip testing system in FIG. 3.

FIG. 5A is a graph showing correlation values for frequency regions, being the result of analysis obtained using a 1-Ω (high-side) technique, from among correlation analysis attack techniques of high-frequency component analysis using the semiconductor chip testing system in FIG. 3.

FIG. 5B is a graph showing correlation values for frequency regions, being the result of analysis obtained using an on-chip monitor technique, from among correlation analysis attack techniques of high-frequency component analysis using the semiconductor chip testing system in FIG. 3.

FIG. 6A is a block diagram showing a configuration of another semiconductor chip testing system according to embodiment 1.

FIG. 6B is a timing chart of various signals showing operation of the semiconductor chip testing system in FIG. 6A.

FIG. 7 is a flowchart showing a semiconductor chip testing process using the semiconductor chip testing system in FIG. 6A.

FIG. 8 is a schematic view of a probe card connected to a semiconductor chip in the semiconductor chip testing system in FIG. 6A.

FIG. 9 is a block diagram showing a configuration of a semiconductor chip 10 provided with an on-chip monitor circuit 20, used in an example in embodiment 1.

FIG. 10 is a graph showing a noise waveform for a power line of a ground-side power voltage Vss, being the result of an experiment on the on-chip monitor circuit 20 in FIG. 9.

FIG. 11 is a graph showing the number of logical gates relative to the number of active encryption modules, being the result of an experiment on the on-chip monitor circuit 20 in FIG. 9.

FIG. 12 is a graph showing the noise voltage Vnoise relative to the number of active encryption modules, being the result of an experiment on the on-chip monitor circuit 20 in FIG. 9.

FIG. 13 is a plan view showing a configuration of an encryption function-equipped system LSI chip having an on-chip monitor circuit according to embodiment 2.

FIG. 14 is a plan view showing a configuration of an encryption function-equipped system LSI chip having an on-chip monitor circuit according to a variation of embodiment 2.

FIG. 15A is a block diagram of embodiment 1 of an on-chip monitor circuit on an encryption function-equipped system LSI chip according to embodiment 2.

FIG. 15B is a circuit diagram showing a first circuit example of an analog front end circuit in FIG. 15A.

FIG. 15C is a circuit diagram showing a second circuit example of an analog front end circuit in FIG. 15A.

FIG. 16 is a timing chart for various signals showing operation of the on-chip monitor circuit in FIG. 15A.

FIG. 17 is a block diagram of embodiment 2 of an on-chip monitor circuit on an encryption function-equipped system LSI chip according to embodiment 2.

FIG. 18 is a timing chart for various signals showing a variation of operation of the on-chip monitor circuit in FIG. 17.

FIG. 19 is a flowchart showing a testing process for an encryption function-equipped system LSI chip having an on-chip monitor circuit in FIG. 15A.

FIG. 20 is a circuit diagram showing a configuration of an on-chip monitor circuit according to a variation of embodiment 2.

EMBODIMENTS OF THE INVENTION

Figure 3B:
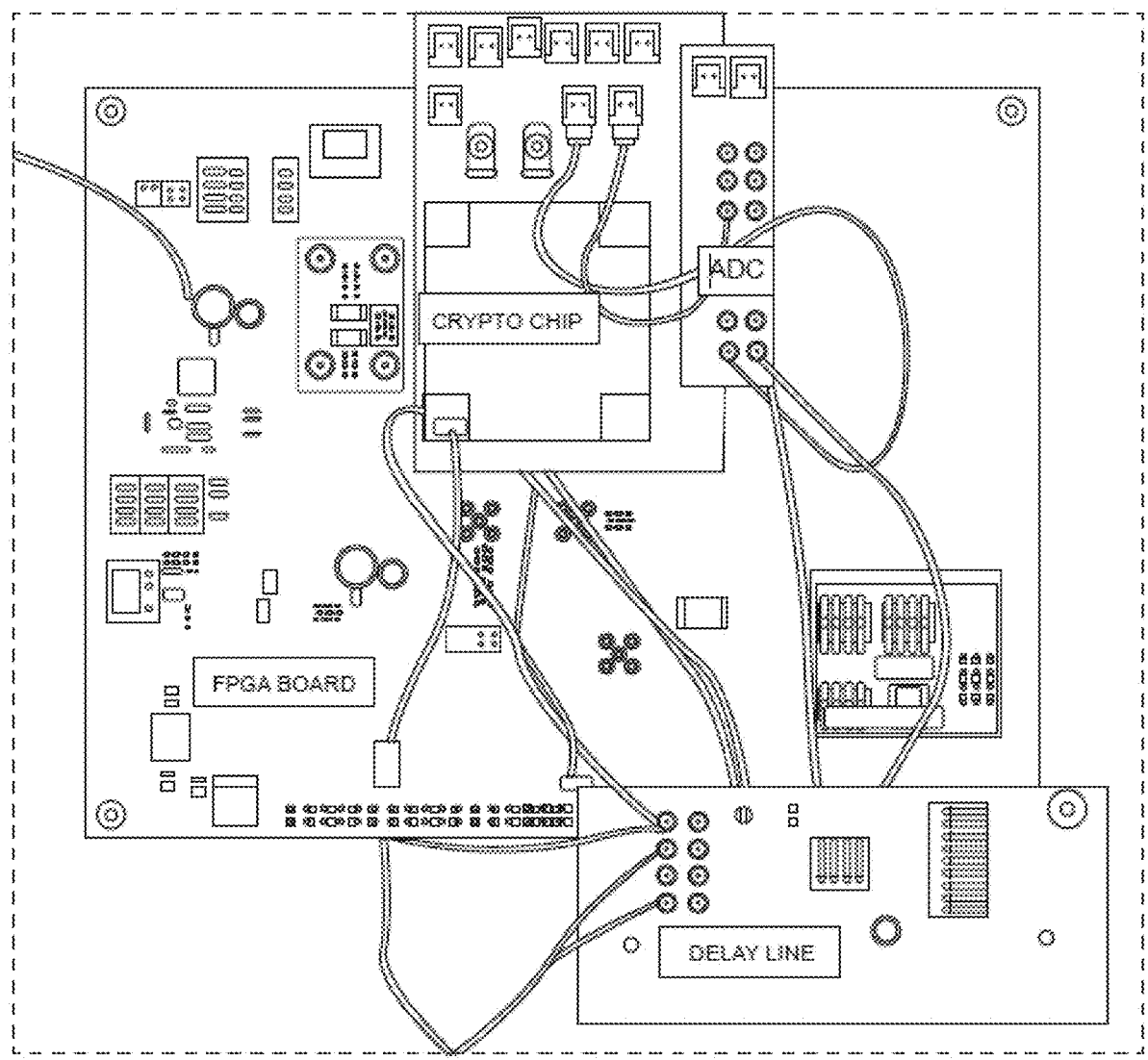
FIG. 3B is a photograph showing the appearance of the prototype semiconductor chip testing system in FIG. 3A.

Embodiments according to the present invention are described below, with reference to the drawings. Note that the same constituent elements are given the same reference numerals in the following embodiments.

Embodiment 1.

1-1. Introduction

It is known that in semiconductor chips having encryption or other security functions, power noise is strongly correlated with the internal circuit operations of the security function. Quantification of side-channel information leakage by power noise and provision of a means for suppressing this are demanded as semiconductor chip technology requirements in hardware security. In embodiment 1, an on-chip noise measurement means (the on-chip monitor circuit) is applied to quantitative diagnosis and testing of side-channel information leakage. A standard evaluation environment for acquiring noise waveforms and side-channel leakages using the on-chip monitor circuit is given, and a proposal is made for embedding it into a test flow related to semiconductor chip security.

In the present embodiment, a hardware security application for an on-chip monitor circuit, particularly an on-chip measurement method for side-channel leakage, is clearly superior to existing measurement techniques. Also proposed is a standard testing environment for side-channel leakage using the on-chip monitor circuit. Also proposed is a semiconductor chip testing system which integrates hardware detection and side-channel leakage evaluation with a test flow relating to semiconductor chip hardware security.

1-2. On-Chip Power Noise Measurement

FIG. 1A is a circuit diagram showing a basic configuration of an on-chip monitor circuit 20 according to embodiment 1. In FIG. 1A, the on-chip monitor circuit 20 has a sample and hold circuit 1 comprising a sampling switch SW1 and a capacitor C1, and a unity gain amp 2. The embedded sample and hold circuit 1 acquires on-chip waveforms, including power noise, inside the semiconductor chip. The sample and hold circuit 1 captures a measured analog voltage using a sampling clock, holds the DC voltage thereof, and outputs it to an external circuit of the semiconductor chip 10. The sampling switch SW1 and the capacitor C1 are constituted using a high-voltage (3.3 V) element. The power voltage (Vdd) of the 1.8-V encrypted core is connected directly to the sample and hold circuit 1, and the DC voltage of the output is buffered and output by the unity gain amp (UGA) 2 having a gain of 1.

FIG. 1B is a circuit diagram showing a basic configuration of an on-chip monitor circuit 20A according to embodiment 1. Because the ground voltage (Vss) and silicon substrate voltage (Vsub) are 0 V, the input voltage has to be shifted to a potential suited to the sample and hold circuit 1 by a p-type source follower circuit 3 comprising p-channel MOS transistors Q1 and Q2, as shown in FIG. 1B.

The on-chip monitor circuits 20 and 20A in FIGS. 1A and 1B were made with the intention of embedding them in the semiconductor test flow, and can thus easily be embedded in the automatic test equipment (ATE), which can cut design costs. Functions provided to the ATE are used for generation of high-precision sample timing and analog/digital (A/D) conversion within a wide voltage range which are needed for operation of the on-chip monitor circuits 20 and 20A. This can prevent power current, chip area, and chip pins from being used up by internal chip components.

The power noise waveform measured inside the semiconductor chip follows dynamic changes in the power consumption in the semiconductor chip, reflecting operation of the circuit during logical processes handling secret information. Furthermore, power consumption by hardware Trojans and the operation of malicious circuits is also included. The measurement involves extremely small fluctuations in voltage, but because the embedded sample and hold circuit 1 can be used to make observations inside the semiconductor chip, it is not susceptible to location and environmental effects. Moreover, the ATE has outstanding general purpose characteristics and stability as a testing environment. Evaluation of side-channel leakages by harmonizing the on-chip monitor circuit 20 and the ATE is useful in testing related to semiconductor chip hardware security.

Next, a prototype semiconductor chip testing system is described, with reference to FIGS. 2 and 3.

FIG. 2 is a plan view showing a layout of a semiconductor chip that is to be measured, FIG. 3A is a block diagram showing a configuration of a prototype semiconductor chip testing system according to embodiment 1, and FIG. 3B is a photograph showing the appearance of the prototype semiconductor chip testing system in FIG. 3A.

To verify the proposed method, a 0.18 μm CMOS process was used to prototype a semiconductor chip with an embedded sample and hold circuit 1 and an encryption circuit, as shown in FIG. 2. In FIG. 2, "AES-A" and "AES-B" are encryption modules, "Switch" is the sampling switch SW1, and "UGA" is the unity gain amp 2.

An AES (advanced encryption standard) encryption circuit was selected for power noise evaluation using the on-chip monitor circuit 20. The AES encryption modules are in an implementation that processes one round per clock cycle, and an "S-box," which is the internal logical structure, is in a composite implementation. Because the main focus is evaluation of side-channel measurement techniques, circuits designed to counteract side-channel attacks have not been implemented. There are two input channels in the on-chip monitor circuit 20 which are connected to the power node (Vdd) of the AES encryption modules, and these can be selected. The power domain of the sample and hold circuit 1 is 3.3 V and is separated from the 1.8 V of the AES encryption modules. Separating the power wire and the ground wire eliminates noise coupling between the power domains, and delivers highly reproducible measurements.

FIG. 3A shows the layout of the prototype semiconductor chip testing system, in which the semiconductor chip 10 is provided with the on-chip monitor circuit 20, which is provided with the encryption modules (AES) 11 and 12, the sample and hold circuit 1, and the unity gain amp 2. An ND conversion circuit 13, a field programmable gate array (FPGA) 14, and a delay line 15 are provided as peripheral circuitry or devices for the semiconductor chip 10.

In FIG. 3A, the sampling timing is generated using a trigger signal that is synchronized with the clock signal (CLK) of the AES cores in the encryption modules 11 and 12, and the delay is controlled using the on-board delay line (DL) 15 of the FPGA 14. The DC signal output buffered in the sample and hold circuit 1 is converted into a digital code by the on-board ND conversion circuit (ADC) 13. The FPGA 14 controls the delay line (DL) 15 and the A/D conversion circuit 13 to acquire the voltage waveform, and the digital code is transferred to a personal computer 16 for data processing. The FPGA 14 also simultaneously controls encryption processing for the AES encryption circuits.

1-3. The On-Chip Monitor and Hardware Security

Evaluation methods for side-channel leakage using the on-chip monitor are described below from the point of view of hardware security. This checks the weakness (or robustness) of the encryption circuits being tested in respect of side-channel attacks. To compare this with an evaluation method using the on-chip monitor, electromagnetic probe measurement and high-side measurement in which 1 Ω is inserted into the power line are also looked at.

First, the extent of leakage of secret information from the time-region waveform is evaluated. Equation (1) gives the SNR of information having a measurement waveform relative to the input into the AES core of the encryption modules 11 and 12.

[Equation 1]

$$SNR = \frac{\text{Var}[E[T \mid X]]}{E[\text{Var}[T \mid X]]} \tag{1}$$

Here, E[.] is a function that gives the time average of the parameters, and Var[.] is a function giving the dispersion of the parameters. T is the measured waveforms, and X is a single byte of the plaintext used in the attack which is input into the AES cores of the encryption modules 11 and 12. A high SNR denotes a larger extent of information leakage, which can be more readily used by an attacker (see, for example, Non-Patent Literature 4). In order to check that the potential for attack changes depending on the measurement method, a correlation power analysis (CPA) (see, for example, Non-Patent Literature 1) is used, which is an actual attack method. CPA is an attack that uses the Pearson correlation coefficient ρ between the measured waveform T of the side-channel leak and the predicted leakage model L.

Next, the frequency components are evaluated. A CPA attack is used for each frequency component to evaluate the extent of information leakage in each frequency component. If information leakage is observed in high-frequency components for waveforms by the on-chip monitor, the on-chip measurement method has a narrow frequency band, and therefore measurement of these components is difficult.

1-4. Leakage Analysis

FIG. 4A is a graph showing SNR relative to selected plaintext, being the result of leakage analysis using the semiconductor chip testing system in FIG. 3. FIG. 4B is a graph showing the estimated entropy of various measurements, being the result of leakage analysis using the semiconductor chip testing system in FIG. 3.

50,000 waveforms were acquired with different plaintext for the power noise in the encryption modules 11 and 12. The operational frequency was 24 MHz. As noted above, measurements were done using the on-chip monitor circuit 20, the 1-Ω (high-side) technique, and electromagnetic probes in two different places. FIG. 4A shows a plot of the SNR given by equation (1) for each measurement. The points with the highest SNR for each byte when divided into 16 partial keys were plotted for the measurements. The SNR was clearly higher for measurements using the on-chip monitor circuit 20 than other methods.

Next, a specific one-byte secret key is focused on first. Five attacks are made using 10,000 waveforms each on the power noise of the encryption modules 11 and 12. The order is found by looking at where the correlation value of the byte value corresponding to the correct key is located in terms of rank from the highest candidate byte value among all expected values. The average of this order is the estimated entropy. The potential for attack is greatest, i.e., the extent of information leakage from the power noise waveform is greatest, for those values which approach 1 fastest. Four types of measurement were made on the AES cores of the same encryption modules 11 and 12, and the estimated entropy was deduced as shown in FIG. 4B. It can be seen that an attack using the on-chip monitor circuit 20 can specify the key using just 1,200 waveforms. On the other hand, the 1-Ω technique and the EM measurement technique EM1 require 2,000 waveforms, while the EM measurement technique EM2 requires 3,100 waveforms. These evaluations indicate that measurement using the on-chip monitor circuit 20 has the highest SNR, i.e., the greatest information leakage.

1-5. High-Frequency Analysis

FIG. 5A is a graph showing correlation values for frequency regions, being the result of analysis obtained using a 1-Ω (high-side) technique, from among correlation analysis attack techniques of harmonic component analysis using the semiconductor chip testing system in FIG. 3. FIG. 5B is a graph showing correlation values for frequency regions, being the result of analysis obtained using an on-chip monitor technique, from among correlation analysis attack techniques of harmonic component analysis using the semiconductor chip testing system in FIG. 3.

Frequency components (or frequency bands) where side-channel information leakage occurs are evaluated. FIGS. 5A and 5B show the results of a CPA on the same measurement waveforms as the previous section, converted to frequency bands using FFT. The results of attacks at each frequency of the power noise waveforms by the on-chip monitor circuit 20 show that there was a great deal of leakage at both high and low frequencies. Specifically, information leakage was confirmed across a broad range: 300 MHz, 620 MHz, 800 MHz, and 1 GHz. In contrast, evaluation of a great deal of noise was inadequate with measurement using the 1-Ω technique at high frequencies. This is because the 1 Ω and the circuit's electrostatic capacitance act as a low-pass filter in the 1-Ω technique, suppressing high-frequency components of information leakage.

Thus, evaluation of side-channel information leakage using the on-chip monitor circuit 20 is thought effective even in fast encryption circuits. Furthermore, the frequencies at which information leakage occurs generally vary depending on the circuit system and/or the device mounting system. The relationship between the hardware security in the semiconductor chip and the technique used can be quantitatively captured by evaluating the extent of information leakage in a broad range of frequencies using the on-chip monitor circuit 20.

1-6. Standard Evaluation Environment for Side-Channel Information Leakage Using the On-Chip Monitor Circuit 1-6-1. Evaluation of Side-Channel Information Leakage Use of the on-chip monitor circuit (OCM) 20 has been proposed as a standard evaluation means for side-channel information leakage in semiconductor chips. As noted in the previous section, measurement using the on-chip monitor circuit 20 obtains a high SNR compared to other measurement methods, making it possible to evaluate the extent of information leakage at a smaller level. Possible reasons for the uncertainty concerning information leakage include process variability and ambient noise. On-chip measurement using the on-chip monitor circuit 20 is not very susceptible to ambient noise. On the other hand, process variability is a universal aspect of manufacturing technologies. The effects of variability can be mitigated through appropriate calibration when using OCM-based measurement.

The on-chip monitor circuit 20 can acquire a voltage at any location inside the chip. One typical example of what is measured is the power voltage pin (Vdd) in the encryption modules 11 and 12. However, there are restrictions on the physical location and wiring of the measured circuit and the on-chip monitor circuit 20, and there are also barriers to the routing of the probe wiring of the on-chip monitor circuit 20. Fluctuation in the potential of the silicon substrate, i.e., substrate noise, is one possible substitute target for measurement. Substrate noise, like power noise, is known to have a waveform that is strongly correlated with operation of the digital circuit inside the chip (see, for examples, Non-Patent Literature 3). Substrate noise is greatly attenuated by distance but can nevertheless be observed from anywhere in the chip, so there is no need to limit the probe location to near the circuit being measured. In other words, substrate noise of the encryption modules 11 and 12 disposed somewhere else on the chip near the location of the on-chip monitor circuit can be observed, making it possible to evaluate side-channel leakage amounts without changing the physical design.

Measurement of substrate noise by the on-chip monitor circuit 20 in this fashion can become a standard evaluation means for side-channel leakage through the silicon substrate. If the flow of mounting the on-chip monitor circuit 20 on a semiconductor chip were automated, the chip area taken up by the on-chip monitor circuit 20 and the number of pins were reduced, and methods were established for detecting and correcting variability in properties of the on-chip monitor circuit 20, applications of security use would probably increase.

1-6-2. Detecting Hardware Trojans

One scenario for entry of malicious Trojans in semiconductor chips involves the wafer process manufacturer altering the mask to embed malicious circuits and structures (see, for example, Non-Patent Literature 7). It is known that Trojan detection methods which measure side-channel information require a reference operation model (a golden model), but how to derive one is an unresolved technical problem. By using the on-chip monitor circuit 20, measurement data on power noise or substrate noise that is very reproducible is collected in chips that are guaranteed to be genuine, on the basis of which reference data or operational models could conceivably be put together.

Trojan detection using side-channel information measurement requires solid measurement of very small changes relative to the reference data, so dependence on the measurement environment and the inclusion of noise from the ambient environment are problems. Evaluation of side-channel leakage using the on-chip monitor circuit 20 could become a solution to this problem, but research efforts directed at detecting physical Trojan operation using the on-chip monitor circuit 20 are needed.

1-7. Semiconductor Chip Testing Method for Hardware Security

1-7-1. Testing Environment

FIG. 6A is a block diagram showing a configuration of another semiconductor chip testing system according to embodiment 1. FIG. 6B is a timing chart of various signals showing operation of the semiconductor chip testing system in FIG. 6A. In FIG. 6A, the measured device (DUT) 100 is provided with a system-on-chip (SoC) 101, an encryption module 102, the on-chip monitor circuit 20 that is provided with the sample and hold circuit 1, a selection switch circuit 105, and a unity gain amp 108, a selection logic circuit 106, and a bias voltage generator 107. The automatic test equipment (ATE) 300 comprises a digital signal generation circuit 301, an arbitrary waveform generator (AWG) 302, and an A/D conversion circuit 303.

The semiconductor chip testing environment is extended as shown in FIG. 6A. By integrating the on-chip monitor circuit 20 that has the sample and hold circuit 1, which has a plurality of input channels, and the automatic test equipment 300 which has a mixed signal extension function, a quantitative evaluation of security requirements related to side-channel information leakage can be defined, in addition to testing of functionality and performance of security semiconductor IC chips. The measured device (DUT: device under test) 100 outputs processing results in response to input test vectors generated by the automatic test equipment 300. The automatic test equipment 300 compares the values output by the measured device 100 with the expected values, and judges whether the semiconductor chip passes/fails, or whether the hardware security requirements are met/not met.

In general, the test vectors used in semiconductor chip testing are generated so as to include operation of all the flip-flops. This increases the likelihood of hardware Trojans launching during functionality or performance testing, making it likelier that a Trojan will be detected during testing of security requirements.

The test vectors also control the on-chip monitor circuit 20, and the sample and hold circuit 1 is selectively operated, having as an input the power wire or the substrate potential of the measured device 100, or the substrate potential near the on-chip monitor circuit 20. The waveform during operation of the encryption module 102 is acquired by the side-channel leakage evaluation. The voltage is held by the sampling timing generated by the automatic test equipment 300, and converted into a digital value by the ND conversion circuit 303 of the automatic test equipment 300. The on-chip monitor circuit 20 and the encryption module 102 are synchronized to the system clock, and the voltage value is repeatedly captured while shifting the sampling timing of the on-chip monitor circuit 20 relative to the system clock during the clock cycle under consideration, thereby acquiring a voltage waveform. (See FIG. 6B.)

1-7-2. Test Flow

FIG. 7 is a flowchart showing a semiconductor chip testing process using the semiconductor chip testing system in FIG. 6A. By extending the test flow of the semiconductor chip as shown in FIG. 7, evaluation items relating to hardware security using the on-chip monitor circuit 20 can be incorporated. The semiconductor chip testing process includes a calibration process (S1), a waveform measurement process (S2), and a waveform detection process (S3).

In step S1, first the amplitude characteristics of the on-chip monitor circuit 20 are calibrated. This calibration process accesses the measured device 100 during step S11, while in step S12 the sample and hold circuit 1 is calibrated.

Next, the waveform measurement process is executed in step S2. Specifically, various functions and aspects of performance of the measured device 100 are evaluated using n test vectors. Of these, the testing of the side-channel leakage in the encryption module 102, for example, is done using the i-th test vector, as an evaluation item relating to hardware security (S13 to S20). The test vectors include signal sets related to control of the on-chip monitor circuit 20, and waveforms are acquired during the clock cycle segment under consideration. The number of divisions k in the waveform acquisition range determines the time resolution of the waveforms, and obtains the voltage value for each period of time equal to the sampling time delayed by a delay j relative to the clock signal. Evaluation of the acquired noise waveforms is also included in the met/not met judgment of the hardware security in the test vector (i). In other words, in the waveform detection process (S3), a function value evaluation (S21), a waveform evaluation (S22), and a met/not met judgment (S23) of hardware security requirements for the measured device 100 are performed.

The waveform acquisition characteristics of the on-chip monitor circuit 20 are calibrated on the basis of the I/O characteristics relative to the sinusoidal waveform signal whose amplitude level is known. The sinusoidal wave is output by the arbitrary waveform generator 302 of the automatic test equipment 300. The waveform acquisition characteristics of the on-chip monitor circuit 20 are determined by the I/O characteristics of the sample and hold circuit 1, etc., making up the on-chip monitor circuit 20, and the time resolution and timing precision of the generation of the sampling timing by the automatic test equipment 300. The device variability which is an aspect of semiconductor chips causes a shift in offset DC voltage and a gain in the on-chip monitor circuit 20, which can be eliminated through sinusoidal wave calibration.

Evaluation of the side-channel information leakage, detection of hardware Trojans, and checking whether a semiconductor chip is genuine or not (i.e., checking for fakes and alterations) use as a reference waveform (the golden model) the power noise waveform obtained for the clock cycle segment under consideration in the same test vector (i) in the measured device 100 that is guaranteed beforehand to be genuine. The average and variations of the reference waveform in the collection of wafers and semiconductor chips which have been confirmed as genuine are compared with the average and variations of waveforms for the power noise and substrate noise in the entire wafer including the semiconductor chip being evaluated. If a significant difference is found in both, even after taking into consideration variations in characteristics after calibration of the on-chip monitor circuit 20, variations in measurement environment such as temperature and power voltage, and so on, the determination is made that the hardware security requirements have not been met.

1-7-3. Testing Costs

FIG. 8 is a schematic view of a probe card connected to a semiconductor chip in the semiconductor chip testing system in FIG. 6A. Specifically, FIG. 8 shows a concept for minimizing implementation costs for a testing method using the on-chip monitor circuit 20 relating to semiconductor chip hardware security requirements. A probe card 200 is provided on a topmost surface with pads 201 to 203 and 211 to 213, and probes 221 to 223 and 231 to 233 connected to the pads and also connected to the pads 121 to 123 and 131 to 133 of the measured device 100. Note that the pads 201 to 203 and 211 to 213 are connected to the automatic test equipment 300. In other words, by providing the pads 121 to 123 and 131 to 133 which are especially for the on-chip monitor circuit 20, which is predicated on wafer-level test access, the effect of the semiconductor chip under evaluation on the I/O pads to the core circuit is minimized, and these are separated from the I/O pads related to assembly of the semiconductor chip. Thus, by measuring the substrate noise near the on-chip monitor circuit 20, the physical location of the on-chip monitor circuit 20 and the specialized pads 121 to 123 and 131 to 133 can be limited to unused areas.

Execution time associated with waveform acquisition by the on-chip monitor circuit 20 is also a testing cost factor. Waveform acquisition by the on-chip monitor circuit 20 causes the measured device 100 and the sample and hold circuit 1, etc., to operate repeatedly, changing the sampling time within the range of the clock cycle segment under consideration. If the time resolution is 0.1 ns and the clock cycle segment is 100 ns (e.g., 10 ns clock cycle×10 cycle segments), then 1000 samplings are needed. The total time length depends on the length of the test vector and the conversion time needed by the analog-to-digital converter, and can be improved by, for example, refining the test vector, designing the circuits in parallel, increasing the through-put of automatic test equipment 300 resources, but this results in a tradeoff with semiconductor chip area, equipment price, and other factors.

1-8. Conclusion

As noted above, in embodiment 1, a hardware security application for the on-chip monitor circuit 20 is proposed, namely an on-chip method for measuring side-channel leakage. Significantly better reproducibility can be obtained compared to conventional techniques for measuring the power current, using on-board resistors and electromagnetic probes. By mounting the on-chip monitor circuit 20 on a semiconductor chip having a security function, the on-chip monitor circuit 20 can be applied to quantitative evaluation of side-channel leakage and detection of hardware Trojans.

EMBODIMENTS

FIG. 9 is a block diagram showing a configuration of a semiconductor chip 10 provided with an on-chip monitor circuit 20, used in the example in embodiment 1. FIG. 10 is a graph showing a noise waveform for a power line of a ground-side power voltage Vss, being the result of an experiment on the on-chip monitor circuit 20 in FIG. 9.

In FIG. 9, a plurality of encryption modules (AES cores) 11, 12, 11A, 12A, . . . are embedded in a semiconductor chip 10, and a power line that supplies a positive power voltage Vdd and a power line that supplies a ground-side power voltage Vss are connected to the encryption modules (AES cores) 11, 12, 11A, 12A, . . . The on-chip monitor circuit 20 measures the voltage Vss on the power line of the ground-side power voltage Vss during the most important clock cycles in the AES operation from the perspective of information leakage. As shown in FIG. 10, the size of the noise measured during these clock cycles is acquired as a noise voltage Vnoise.

FIG. 11 is a graph showing a number of logical gates relative to the number of active encryption modules, being the result of an experiment on the on-chip monitor circuit 20 in FIG. 9. FIG. 12 is a graph showing the noise voltage Vnoise relative to the number of active encryption modules, being the result of an experiment on the on-chip monitor circuit 20 in FIG. 9.

As is clear from FIG. 11, the number of logical gates per encryption module (AES core) varies depending on the design, but is generally 12.824 kgates/core. As can be seen in FIG. 12, the noise voltage Vnoise per encryption module (AES core) reaches 0.75 mV/core, based on the measurement of the voltage Vss on the on-chip ground-side power line. About 2 mV of the noise voltage Vnoise is present as background noise, which is recognized as the lowest measurable noise voltage during measurements of the noise voltage Vnoise.

Assuming that the noise voltage Vnoise changes in a linear relationship of 0.75 mV/core, dividing 0.75 mV by 12824 shows that the noise voltage Vnoise is about 60 nV/gate. With a voltage resolution of 10 µV, the threshold number of detectable gates for detecting intentionally inserted undesirable circuits is around 100 in this case. For example, according to Non-Patent Literature 8, the number of gates in a Trojan horse circuit is 190, which is around 2.5% of the original circuitry of a compact encryption module (AES core). Accordingly, Trojan horse and other circuits, for example, can be detected without fail using the on-chip monitor circuit 20 according to embodiment 1.

EMBODIMENT 2

FIG. 13 is a plan view showing a configuration of an encryption function-equipped system LSI chip 400 having an on-chip monitor circuit 20 according to embodiment 2. As shown in FIG. 13, embodiment 2 is a system VLSI chip 400 having an encryption module 402 in addition to various function modules 401, comprising an on-chip monitor circuit 20. In FIG. 13, after a system input signal reaches the encryption module 402 via a signal transmission path 403, a predetermined system output signal is output. When this happens, the on-chip monitor circuit 20, for example, is used to, for example, respond to a monitor control signal from the automatic test equipment 300, measure the potential of the silicon substrate which is a subject of observation 25, and output a monitor output signal of the measurement results.

In the system VLSI chip 400 thus configured, the encryption module 402 is embedded along with the various function modules 401 and thus cannot be identified by an attacker, and therefore the circuit configuration of the encryption module 402 or its physical location in the chip cannot be discovered. Moreover, the on-chip monitor circuit 20 observes the potential of the silicon substrate near to it, and does not have any obvious probing wires leading to the encryption module 402, which provides the unique advantage of an attacker being unable to follow the signal transmission path 403.

FIG. 14 is a plan view showing a configuration of an encryption function-equipped system LSI chip having an on-chip monitor circuit according to a variation of embodiment 2. As shown in FIG. 14, the on-chip monitor circuit 20 may also observe the power wire inside the encryption module 402 or the ground wire. The signal transmission path 403 of the probing wire leading to the encryption module 402 can be made difficult to follow by making it look like internal wiring of the VLSI.

FIG. 15A is a block diagram of embodiment 1 of an on-chip monitor circuit 20 on an encryption function-equipped system LSI chip according to embodiment 2. In FIG. 15A, the on-chip monitor circuit 20 is provided with a window register 21, a clock counter 22, a comparator 23, and an analog front end circuit 24.

First, the window register 21 is loaded with a predetermined preloaded value from the automatic test equipment, for example, that designates a time window (for example the value of 1 is given when, for example, the window opens, and the value of 0 is given when, for example, the window closes, resulting in, for example, digital data such as "0000011111100000"), which is temporarily stored. Next, during the time window after a reset by a reset signal from the automatic test equipment, for example, the clock counter 22 counts the number of clock cycles, and the comparator 23 compares that value with the preloaded window register value, and, if the values match, generates a sampling pulse which is output to the analog front end circuit 24. The on-chip monitor circuit 20 can thus be realized in a manner that allows it to determine its own observation timing. During the predetermined time window the analog front end circuit 24 observes the waveform of the potential of the silicon substrate being observed (FIG. 13) or of an internal power node in the encryption module 402 (FIG. 14). If the time window is configured so as to be a time period related to unique information leakage in the encryption process of the encryption module 402, during which the signal waveform of the subject of observation is measured, allowing a determination of whether hardware security requirements are met/not met, attacks by malicious actors can be further prevented.

FIG. 15B is a circuit diagram showing a first circuit example of an analog front end circuit in FIG. 15A. FIG. 15C is a circuit diagram showing a second circuit example of an analog front end circuit in FIG. 15A. The analog front end circuit 24 of the on-chip monitor circuit 20 in FIG. 15A may have the sample and hold (SH) circuit configuration of FIG. 15B or the comparator (SF+LC) configuration of FIG. 15C, for example. Note that the analog front end circuit 24 in FIG. 15C is provided with a source follower circuit 3 comprising two p-channel MOS transistors Q11 and Q12, and a latch comparator 4.

FIG. 16 is a timing chart for various signals showing operation of the on-chip monitor circuit 20 in FIG. 15A. The window register value is set such that the on-chip monitor circuit 20 sampling pulse is generated during the clock cycle when there is the most side-channel information leakage in the encryption module 402 during the extremely long operation test time of the system VLSI chip 400. Note that the number of clock cycles (N) is counted with the system reset being the reference (N=0).

FIG. 17 is a block diagram of embodiment 2 of an on-chip monitor circuit 20A on an encryption function-equipped system LSI chip according to embodiment 2. Compared to the on-chip monitor circuit 20 in FIG. 15A, the on-chip monitor circuit 20A in FIG. 17 is further provided with a delay register 26 that temporarily stores a delay code, and a delay generator 27 that generates a sampling pulse ($\varphi$) by delaying the start timing of the time window by delaying the trigger signal by an amount of time equal to a delay time corresponding to the delay code. In embodiment 2, the sampling pulse ($\varphi$) is generated at a timing delayed by an amount equal to the delay time specified by the delay register value by the delay generator 27 during the clock cycle in which the clock count value as counted by the clock counter 22 matches the window register value stored in the window register 21.

FIG. 18 is a timing chart for various signals showing operation of the on-chip monitor circuit 20A in FIG. 17. As shown in FIG. 18, a delay time that is controlled ahead of time can be added by the designated delay code (FIG. 17) in order to make the sampling time of the on-chip monitor match the (start) timing of when the information leakage is greatest or most notable, during the clock cycles during which information leakage form the encryption module is produced.

FIG. 19 is a flowchart showing a testing process for an encryption function-equipped system LSI chip having an on-chip monitor circuit 20 in FIG. 15A.

In FIG. 19, first a predetermined preloaded value Nw is set in the window register 21 in step S31. Next, in step S32, a test vector is generated and input which is configured such that the information leakage cycle matches the window register (i.e., Nleak=Nw is satisfied; another possibility is that N leak is at least included in Nw). Note that this condition is embedded in the test vector generation flow for the purpose of testing the functionality of the system VLSI chip 400. Furthermore, in step S33, the target semiconductor chip is repeatedly tested and the information leakage during the information leakage cycle is quantified. The hardware security requirement met/not met judgment is made (i.e., a security evaluation is made, e.g., of whether or not a malicious circuit such as a Trojan horse is included, whether or not information is being leaked by the encryption module 402, etc.), and the judgment result is output. Once the test finishes, in step S34, the window register 21 is set to zero (or a dummy value) and the test process is terminated.

Note that when the on-chip monitor circuit 20A of FIG. 17 is used, it is also possible to evaluate and extract the timing during which the information leakage is most notable ahead of time and set the delay amount of the delay generator 27 in the delay register 26 in step S31.

Furthermore, in step S34, it is possible for a zero value or a dummy value which is unknown to the malicious actor to be set in at least either the window register 21 or the delay register 26, and to terminate with a logical "unmodifiable." The following techniques are possible for making these registers logically unmodifiable.

(1) Use a one-time memory (or single-rewrite memory) for the delay register 26.

(2) Set a hidden bit and make the registers unrewritable when the hidden bit is set to 1.

FIG. 20 is a circuit diagram showing a configuration of an on-chip monitor circuit 20B according to a variation of embodiment 2. As shown in FIG. 20, it is also possible to provide an SNR computation device 5 for performing CPA, for example, in the last stage of the analog front end circuit 24 for on-chip monitoring, provided with the source follower circuit 3 and a latch comparator 4.

Figure 21:
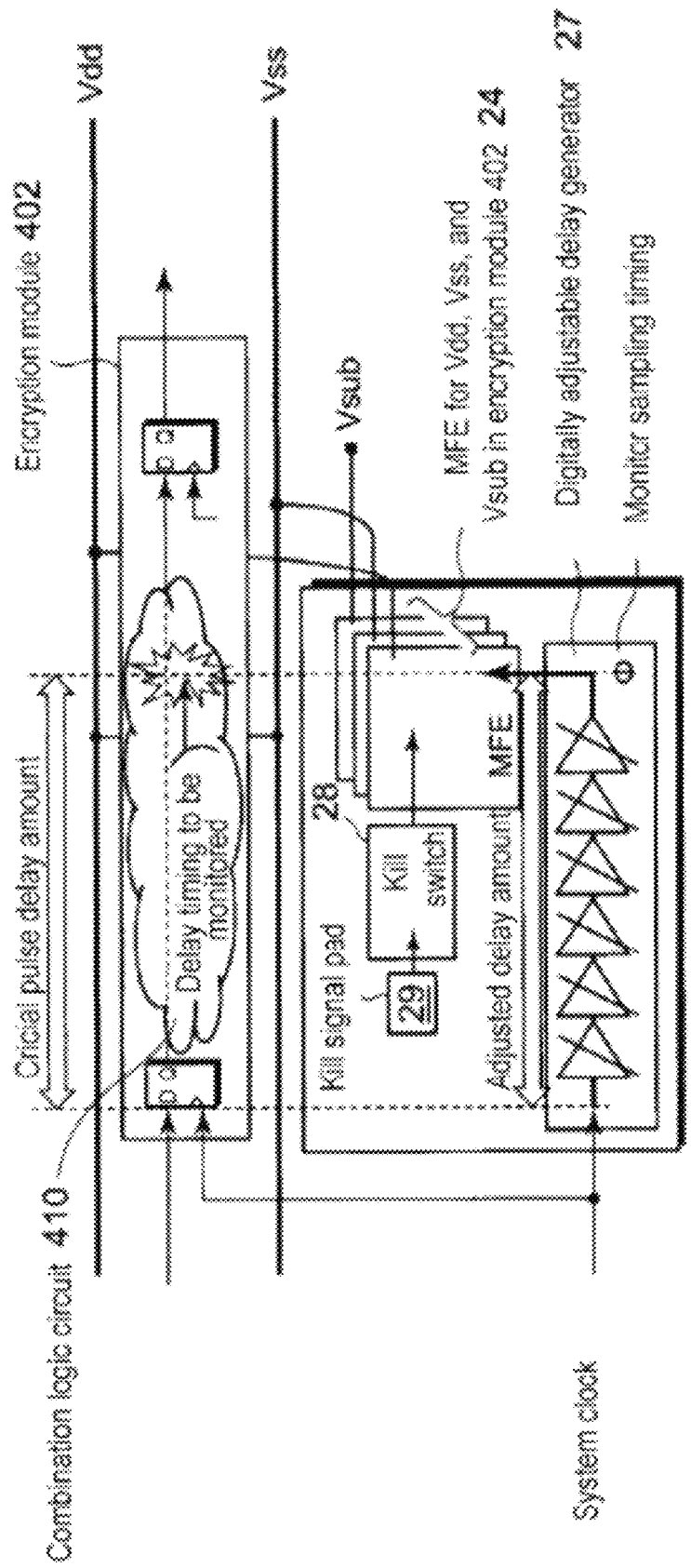
FIG. 21 is a block diagram showing features within an overall configuration of a semiconductor chip testing system according to embodiment 2.

FIG. 21 is a block diagram showing features within an overall configuration of a semiconductor chip testing system according to embodiment 2. As shown in FIG. 21, the timing at which the information leakage is most notable can be evaluated ahead of time so as to extract the noise waveform for the power or the potential of the silicon substrate by generating a monitor sampling timing using the delay generator 27 in which a predetermined critical pulse delay amount in a combined logic 410 of the encryption module 402 can be digitally adjusted. After the test finishes, testing of the encryption module 402 can be disabled by a kill signal input via a kill signal pad 29 or by setting the zero or dummy value in the window register 21 (FIGS. 15A and 17).

In the aforementioned embodiments and variations, a semiconductor chip provided with an encryption module was described, but the present invention is not limited to this, and may be, for example, a security function module that has security functions such as a security ID generation function using a PRNG (pseudo-random number generator) or a PUF (physically unclonable function, involving element variation, etc.), a function for counteracting alteration of a digital signature function, an individual identification function, or the like, and outputs a security function signal after subjecting an input signal to a security function process.

In the aforementioned embodiments and variations, a zero or dummy value which is unknown to a malicious actor is set in at least either the window register 21 or the delay register 26 after chip testing is finished, making the register logically "unmodifiable," and operation of the on-chip monitor circuit 20 is stopped, but the present invention is not limited to this. It is also possible to forcibly stop operation of the on-chip monitor circuit 20 after testing of the semiconductor chip is finished.

INDUSTRIAL APPLICABILITY

As detailed above, with the on-chip monitor circuit according to the present invention, an on-chip monitor circuit, etc., can be provided for testing a semiconductor chip so as to be able to prevent, for example, Trojan horse and other security attacks, which embed malicious circuits during the fabrication stage of semiconductor chips provided with security function modules, using the on-chip monitor circuit in semiconductor chips which require security.

EXPLANATION OF THE REFERENCE NUMERALS

1 . . . sample and hold circuit
2 . . . unity gain amp
3 . . . source follower circuit
4 . . . comparator
5 . . . computation device
10 . . . semiconductor chip
11, 12, 11A, 12A . . . encryption modules
13 . . . A/D conversion circuit
14 . . . field programmable gate array (FPGA)
15 . . . delay line
16 . . . personal computer
20, 20A, 20B . . . on-chip monitor circuit
21 . . . window register
22 . . . clock counter
23 . . . comparator
24, 24A . . . analog front end circuit
25 . . . subject of observation
26 . . . delay register
27 . . . delay generator
28 . . . kill switch
29 . . . kill signal pad
100 . . . measured device (DUT)
101 . . . system-on-chip (SoC)
102 . . . encryption module
103, 104 . . . source follower circuit
105 . . . selection switch circuit
106 . . . selection logic circuit
107 . . . bias voltage generator
121 to 123, 131 to 133 . . . pads
200 . . . probe card
201 to 203, 211 to 213 . . . pads
221 to 223, 231 to 233 . . . probes
300 . . . automatic test equipment (ATE)
301 . . . digital signal generation circuit
302 . . . arbitrary waveform generator (AWG)
303 . . . ND conversion circuit
400 . . . system LSI chip
401 . . . function module
402 . . . encryption module
403 . . . signal transmission path
C1 to C3 . . . capacitors
Q1 to Q12 . . . MOS transistors
S1 . . . calibration process
S2 . . . waveform measurement process
S3 . . . waveform detection process
SW1, SW11 to S13 . . . sampling switches

The invention claimed is:

1. An on-chip monitor circuit mounted on a semiconductor chip that is provided with a security function module that performs a security function process on an input signal and outputs a security function signal, the on-chip monitor circuit being provided with a monitor circuit that monitors a signal waveform of the semiconductor chip, wherein the on-chip monitor circuit comprises:
   a first storage configured to store data that designates a time window during which the semiconductor chip is tested,
   a second storage configured to store a delay code that has been input, and
   a controller configured to control such that when a predetermined test signal is input by the security function module the monitor circuit operates during the time window, wherein the controller delays timing of the time window by a delay time corresponding to the delay code.

2. The on-chip monitor circuit as claimed in claim 1, wherein the controller comprises:
   a counter configured to count clock signals and output count value data after receiving a reset signal, and
   a comparator configured to compare the count value data and data designating the time window and to cause the monitor circuit to operate when the data match.

3. The on-chip monitor circuit as claimed in claim 1, wherein the time window is the period of time during which there is the most information leakage in the security function module.

4. The on-chip monitor circuit as claimed in claim 1, wherein the delay code indicates a delay amount that designates a timing during which there is the most information leakage from the security function module.

5. The on-chip monitor circuit as claimed in claim 1, wherein the monitor circuit monitors the signal waveform of the substrate potential of the semiconductor chip or the power potential of the security function module.

6. The on-chip monitor circuit as claimed in claim 1, wherein the controller stops operation of the monitor circuit after testing of the semiconductor chip is finished.

7. The on-chip monitor circuit as claimed in claim 1, wherein the controller is rendered logically unrewritable by storing at least one predetermined value from the first storage or the second storage after testing of the semiconductor chip is finished.

8. The on-chip monitor circuit as claimed in claim 1, wherein the security function module is an encryption module.

9. A semiconductor chip provided with a security module that performs a security function process on an input signal and outputs a security function signal, wherein the semiconductor chip comprises:
- an on-chip monitor circuit mounted on the semiconductor, the on-ship monitor circuit being provided with a monitor circuit that monitors a signal waveform of the semiconductor chip, wherein the on-chip monitor circuit comprises:
  - a first storage configured to store data that designates a time window during which the semiconductor chip is test,
  - a second storage configured to store a delay code that has been input, and
  - a controller configured to perform control such that when a predetermined test signal is input by the security function module the monitor circuit operates during the time window, wherein the controller delays timing of the time window by a delay time corresponding to the delay code.

10. A semiconductor chip testing system, comprising a semiconductor chip and a testing device that tests the semiconductor chip,
- wherein the semiconductor chip is provided with a security module that performs a security function process on an input signal and outputs a security function signal, the semiconductor chip comprising an on-chip monitor circuit mounted on the semiconductor, the on-chip monitor circuit being provided with a monitor circuit that monitors a signal waveform of the semiconductor chip, the on-chip monitor circuit comprising:
  - a first storage configured to store data that designates a time window during which the semiconductor chip is tested,
  - a second storage configured to store a delay code that has been input, and
  - a controller configured to perform control such that when a predetermined test signal is input by the security function module the monitor circuit operates during the time window, wherein the controller delays timing of the time window by a delay time corresponding to the delay code, and
- wherein the testing device is provided with
  - a test signal generator configured to generate a test signal and to deliver said test signal to the semiconductor chip such that a time period of information leakage from the security function module falls within the time window, and
  - an arbiter configured to judge a security score by quantifying information leakage from the security function module on the basis of the signal waveform from the monitor circuit.

11. A method for testing a semiconductor chip using an on-chip monitor circuit that is mounted on the semiconductor chip that is provided with a security function module that performs a security function process on an input signal and outputs a security function signal, the on-chip monitor circuit being provided with a monitor circuit that monitors a signal waveform of the semiconductor chip, wherein the method comprises:
- a step of storing to a first storage data that designates a time window during which the semiconductor chip is tested,
- a step of storing a delay code that has been input into a second storage, and
- a step of performing control such that when a predetermined test signal is input by the security function module the monitor circuit operates during the time window, and
- a step of delaying timing of the time window by a delay time corresponding to the delay code.

12. The method for testing a semiconductor chip as claimed in claim 11, further comprising:
- a step of generating a test signal and delivering said test signal to the semiconductor chip such that a time period of information leakage from the security function module falls within the time window, and
- a step of judging a security score by quantifying information leakage from the security function module on the basis of the signal waveform from the monitor circuit.

13. The method for testing a semiconductor chip as claimed in claim 11, further comprising a step of stopping operation of the monitor circuit after testing of the semiconductor chip is finished.

14. The method for testing a semiconductor chip as claimed in claim 11, further comprising a step of producing a logically unrewritable state by storing at least one predetermined value from the first storage or the second storage after testing of the semiconductor chip is finished.

15. The method for testing a semiconductor chip as claimed in claim 11, wherein the security function module is an encryption module.

* * * * *